(12) United States Patent
Cranston et al.

(10) Patent No.: US 6,668,263 B1
(45) Date of Patent: Dec. 23, 2003

(54) METHOD AND SYSTEM FOR EFFICIENTLY SEARCHING FOR FREE SPACE IN A TABLE OF A RELATIONAL DATABASE HAVING A CLUSTERING INDEX

(75) Inventors: Leslie A. Cranston, Toronto (CA); Nelson Hop Hing, Scarborough (CA); Matthew A. Huras, Ajax (CA); Bruce G. Lindsay, San Jose, CA (US); Michael J. Winer, Markham (CA)

(73) Assignee: International Business Machines Corporation, Armonk, NY (US)

( * ) Notice: Subject to any disclaimer, the term of this patent is extended or adjusted under 35 U.S.C. 154(b) by 383 days.

(21) Appl. No.: 09/651,884

(22) Filed: Aug. 30, 2000

(30) Foreign Application Priority Data

Sep. 1, 1999  (CA) .............................................. 2281287

(51) Int. Cl.[7] .............................................. G06F 17/30
(52) U.S. Cl. .............................. 707/205; 707/10; 707/3; 709/226
(58) Field of Search ................................ 707/200–206, 707/1–3, 10, 8; 711/211; 709/223, 226

(56) References Cited

U.S. PATENT DOCUMENTS

| | | | | |
|---|---|---|---|---|
| 5,555,405 A | * | 9/1996 | Griesmer et al. | ........... 707/205 |
| 5,561,793 A | * | 10/1996 | Bennett et al. | ............. 707/201 |
| 5,659,743 A | * | 8/1997 | Adams et al. | ............... 707/205 |

\* cited by examiner

Primary Examiner—John Breene
Assistant Examiner—Mohammad Ali
(74) Attorney, Agent, or Firm—David W. Victor; Konrad Raynes Victor & Mann, LLP

(57) ABSTRACT

A method of searching a table in a database management system for free space for inserting a new record into the table. The table resides in a storage media, and includes a series of pages capable of storing a plurality of records. The table has a clustering index defined in a column of the table. The new record has a new record attribute for storing in the column of the table when the new record is stored in the table. The method comprises searching for a target page in the series of pages, the target page being selected to maintain clustering when the new record is inserted thereon. Once the target page has been located, it is searched for sufficient free space to accommodate the new record. If sufficient free space is found on the target page, then the new record is inserted on the target page. If sufficient free space is not found on the target page, then a target neighborhood of pages in the series of pages is searched for sufficient free space to accommodate the new record. The target neighborhood of pages surrounds the target page. If sufficient free space is found on a page in a target neighborhood of pages, then the new record is inserted on to this page in the target neighborhood of pages. If sufficient free space is not found in the target neighborhood of pages, then the method further comprises searching for sufficient free space to accommodate the new record outside the target neighborhood of pages. If sufficient free space is found outside the target neighborhood of pages, then the new record is inserted on a non-neighboring page outside the target neighborhood of pages. If sufficient free space is not found outside the target neighborhood of pages, then a new page having the new record is appended to the end of table.

63 Claims, 27 Drawing Sheets

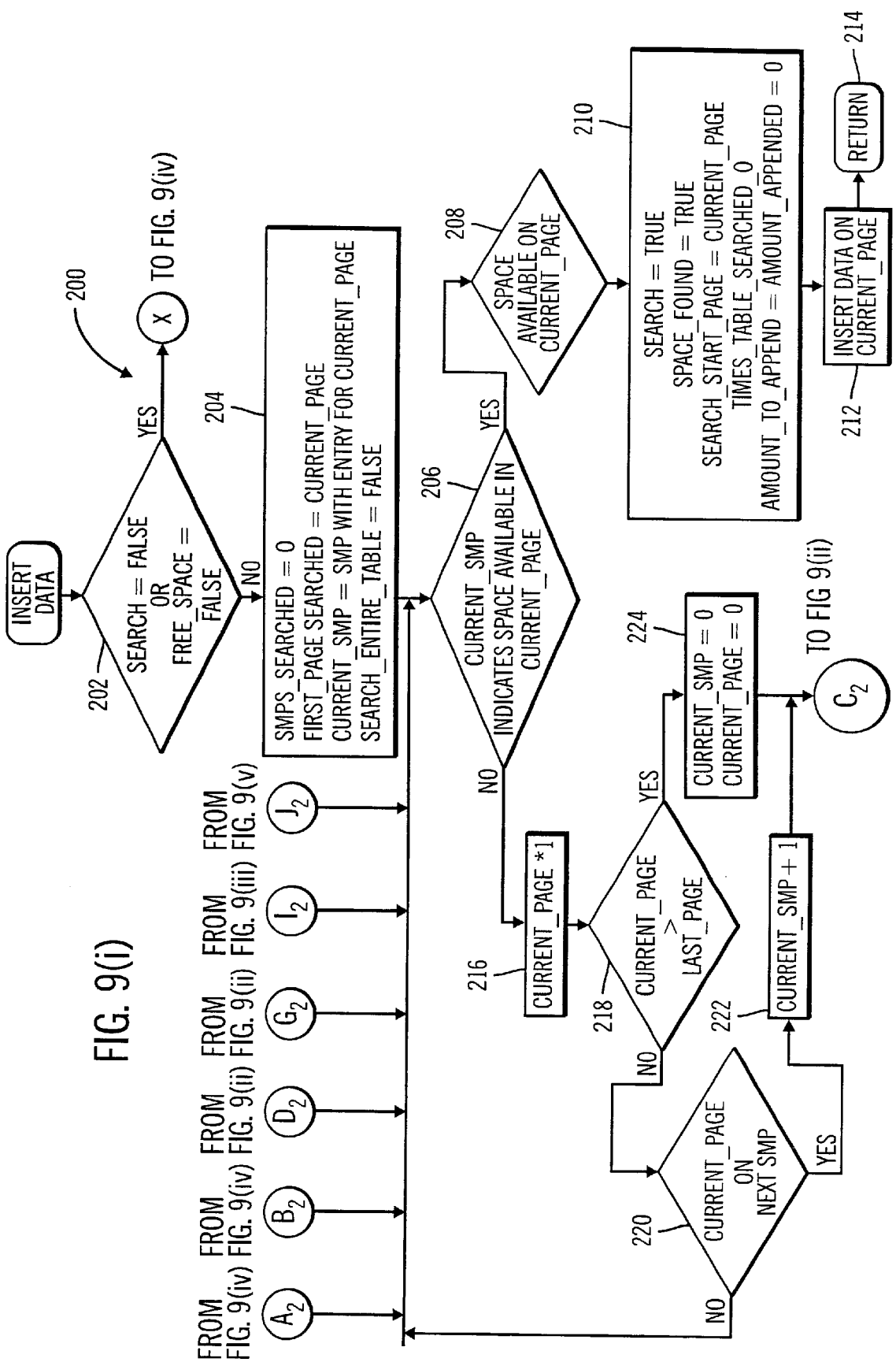

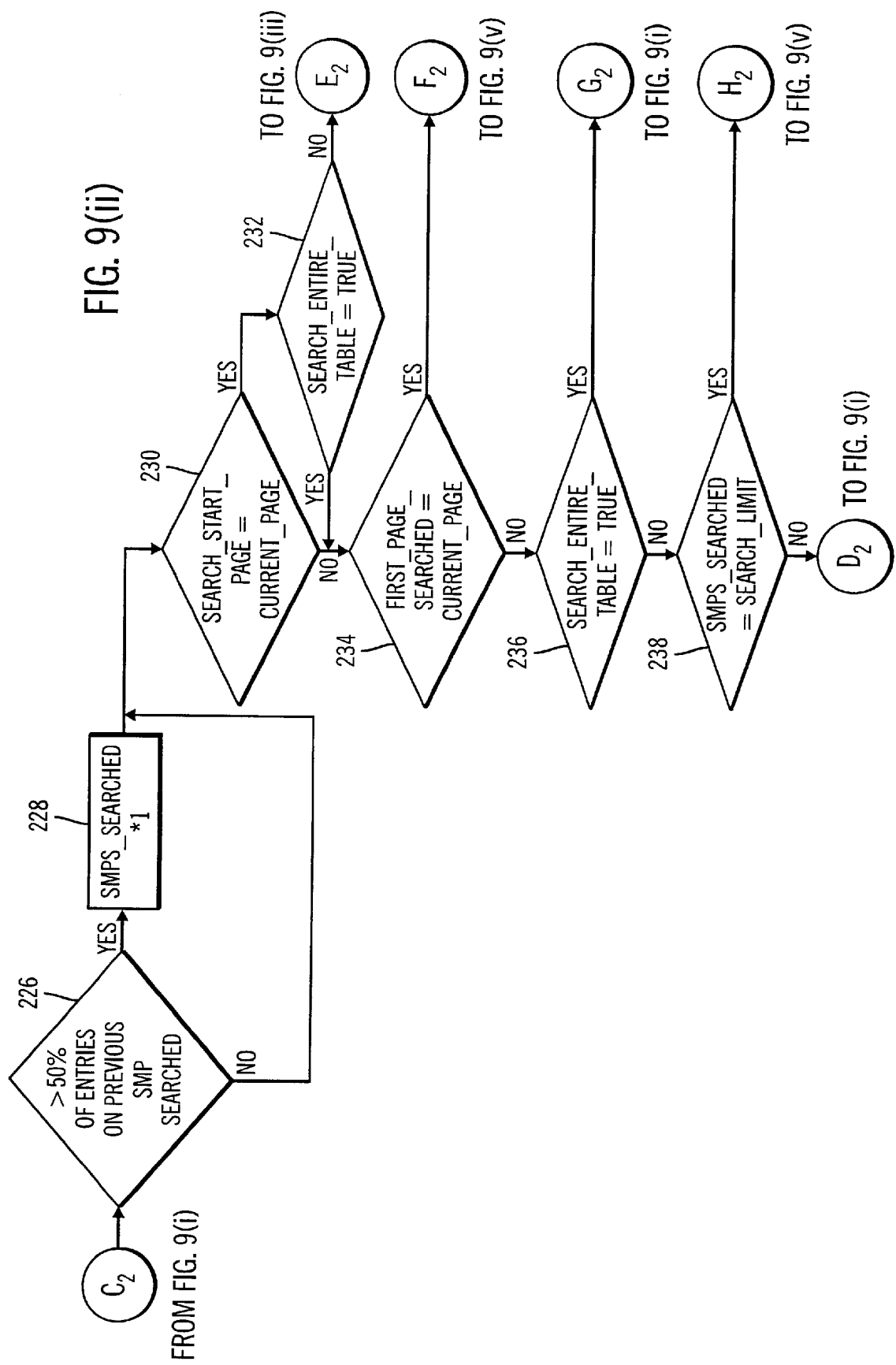

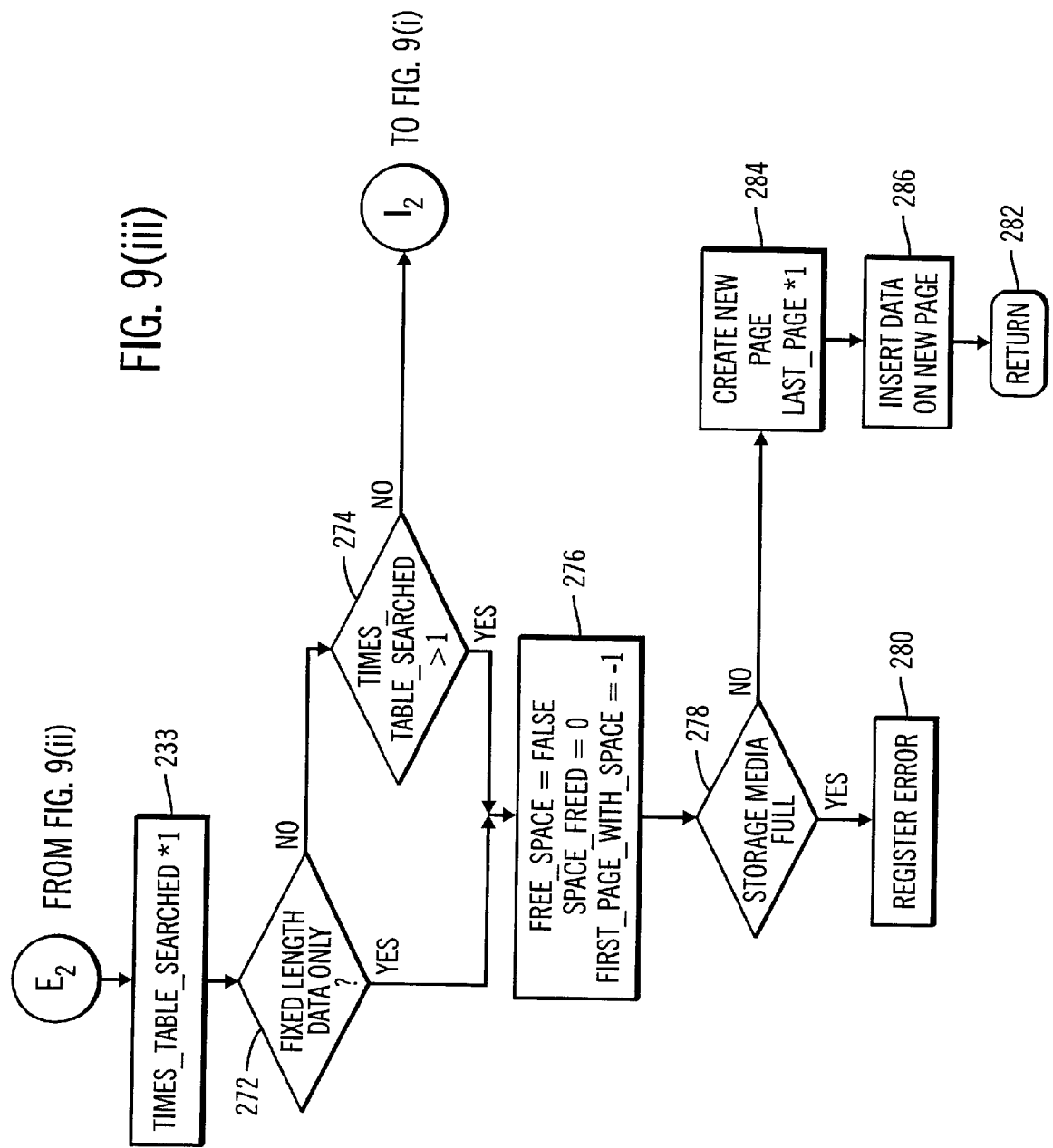
FIG. 9(iii)

Diagram 1: Target FSMP

| | 0 | 1 | 2 | 3 | 4 | 5 | 6 | 7 | 8 | 9 |
|---|---|---|---|---|---|---|---|---|---|---|
| Page Offset | 7 | 0 | 5 | 10 | 2 | 3 | 1 | 0 | 0 | 12 |

Offset  0  1  2  3  4  5  6  7  8  9

FIG. 15

Diagram 2: Next FSMP

| | 10 | 11 | 12 | 13 | 14 | 15 | 16 | 17 | 18 | 19 |
|---|---|---|---|---|---|---|---|---|---|---|
| Page Offset | 0 | 5 | 3 | 0 | 7 | 1 | 0 | 6 | 2 | 0 |

Offset  0  1  2  3  4  5  6  7  8  9

FIG. 16

I. Pseudocode for Finding the Target Page for a Key Value in a Clustering Index

A:
Fix the root page of the index

B:
if (not yet at the leaf level)
{
    locate the key value in the current page
    if (the key is found or the next key is on the page)
    {
        fix the page on the next lower level of the index
        if (the page is not the right page)
        {   latch the index
        }   retry from the root level (point A)
        else
        {   continue from point B }
    }
    else
    {
        latch the index
        retry from the root level (point A)
    }
}
else (at the leaf level)
{
    locate the key value in the current leaf page
    if (the actual value is found)
    {   determine the page containing this record from the RID
    }   return OK
    else
    {
        locate the next key on the page
        if (a key is found)
        {   determine the page containing this record from the RID
        }   return OK
        else
        {   if (there's a next page)
            {   unfix this page
                    fix next page
                    locate the first key on this page
            }   return OK
            else
            {   return RECORD NOT FOUND   }
        }
    }
}

FIG. 17

II. Pseudocode for Searching Target Free Space Map Page

```
search the clustering index for the target page (see pseudocode I)
if (target page not found, ie returned RECORD NOT FOUND)
{
    append the row at the end of the table
    return OK
}
fix the target page
if (there's enough space on the page for the record)
{
    insert the record on this page
    return OK
}
determine the free space map page (FSMP) that contains an offset for the target page
determine the last page of this target FSMP
set Page = target page + 1
set Counter = 1
set Sign = 1
set Offset in FSMP = offset of target page + 1
A:
if (page is < = last page of FSMP or > = first page of FSMP)
{
    if (FSMP indicates there may be enough space for the record on the page)
    {
        unfix the last page fixed
        fix the page
        if (there's actually enough space on the page)
        {
            insert the record on this page
            return OK
        }
    }
    use spiral macro to move to the next offset and page (see Pseudocode III)
    check that page (point A)
}
At this point we've hit one of the boundaries of the FSMP
use spiral macro to move to the next offset and page on the other side of the target
page (Pseudocode III)
if (there are pages to check to the right of the target page - Sign is positive)
{ determine the number of pages left to check before the right-hand boundary
  of the FSMP  }
else
{ determine the number of pages left to check before the left-hand boundary of
  the FSMP  }
set Counter = 0
```

FIG. 18a

```
B:
if (counter < number of pages left to check)
{
    if (the FSMP indicates there might be enough space on this page for the record)
    {
        unfix the last page fixed
        fix the page
        if (there's actually enough space on the page)
        {
            insert the record on this page
            return OK
        }
    }
    increment Counter
    if (moving right)
    {  increment page and offset in FSMP  }
    else
    {  decrement page and offset in FSMP  }
    check this page (point B)

} return NO SPACE FOUND
```

FIG. 18b

III. Pseudocode for Macro to Determine Next Page and Offset in Spiral

<u>Input and Output:</u> Sign (with value 1 or -1)
                               Counter
                               Page
                               Offset in FSMP invert Sign (if sign is -1, set it to 1: if 1, set it to -1)
increment Counter
add (Counter *Sign) to Page
add (Counter * Sign) to Offset in FSMP

FIG. 19

IV. Pseudocode for Worst Fit Algorithm for Searching a Non-Target Free Space Map Page

```
fix the Free Space Map Page
set Counter = 0
set numberOfEntries = 0
set Page = cached page, or first page referenced by this FSMP
set Offset = offset in FSMP for Page
A:
if (there's potentially at least enough space on Page)
{
    copy the FSMP offset and amount of free space to a temporary array
    increment numberOfEntries
}
increment Page and Offset
check these values (point A)

if (numberOfEntries > 0)
{
    if (numberOfEntries > 1)
    {
        sort the temporary array in descending order of free space available
    }
    for (each Offset in the array)
    {
        unfix the last page
        fix the page associated with this Offset
        if (there's actually enough space on the page for the record)
        {
            insert the record on this page
            return OK
        }
    }
}
return NO SPACE FOUND
```

FIG. 20

METHOD AND SYSTEM FOR EFFICIENTLY SEARCHING FOR FREE SPACE IN A TABLE OF A RELATIONAL DATABASE HAVING A CLUSTERING INDEX

A portion of the disclosure of this patent document contains material that is subject to copyright protection. The copyright owner has no objection to the facsimile reproduction by anyone of the patent document or the patent disclosure, as it appears in the Patent Office patent files or records, but otherwise reserves all copyrights whatsoever.

FIELD OF THE INVENTION

The present invention relates to database management systems and more particularly to a method and system for searching for free space in a table of a relational database management system, where the table has a clustering index defined on at least one or more of its columns.

BACKGROUND OF THE INVENTION

A database management system (DBMS) includes the combination of an appropriate computer, direct access storage devices (DASD) or disk drives, and database management software. A relational database management system is a DBMS that uses relational techniques for storing and retrieving information. The relational database management system or RDBMS comprises computerized information storage and retrieval systems in which data is stored on disk drives or DASDs for semi-permanent storage. The data is stored in the form of tables which comprise rows and columns. Each row or tuple has one or more columns.

A typical database management system includes both database files and index files. The database files store data in the rows and columns of tables stored on data pages. In such a table, the rows may correspond to individual records while the columns of the table represent attributes of the records. For example, in a customer information table of a database management system, each row might represent a different customer, while each column represents different attributes of the customers such as the name of each customer, the amount owed by each customer and the cash receipts received from each customer.

Instead of providing for direct sorting and searching of the records in the tables, the database management system relies on the index files, which contains information or pointers about the location of the records in the tables stored in the database files. The index can be searched and sorted (scanned) much more rapidly than can the database files. An index is scanned through transactions in which criteria are stipulated for selecting records from a table. These criteria include keys, which are the attributes by which the database finds the desired record or records using the index.

An index for a table is said to be "clustered" when the rows of the underlying table are physically stored so that each data page contains all rows, and only those rows, of a key interval of the index. Referring to FIG. 22, there is illustrated an index on unclustered data. FIG. 23, shows a B-Tree index for the same data; however, in FIG. 23 the data has been clustered. The differences between clustered and unclustered indexes can be seen by focusing on the key value "N". In both the B-Tree indexes of FIG. 22 and 23, the leaf nodes of the B-Tree indexes point to four records in the underlying tables; these records are identified by the record identifiers of four keys. The record identifiers are rid1, rid2, rid3 and rid4. In the unclustered B-Tree index of FIG. 22, the key interval <N,rid1> to <N,rid2> is stored on two different data pages—specifically data pages 1 and 2. Similarly, the key interval <N,rid3> to <N,rid4> are stored on data pages 2 and 3. This contravenes the definition of a clustered index that the rows of the underlying table be physically stored so that each data page contains all rows, and only those rows of a key interval of the index. Turning to the B-Tree index and underlying data pages of FIG. 23, the same data is shown clustered. Specifically, the key interval <N,rid1> to <N,rid2> points to rows that are stored on data page 2, and the key interval <N,rid3> to <N,rid4> points to data that is stored on data page 3. Note that the records need not be adjacently located on the same data page. While the records underlying <N,rid3> and <N,rid4> both lie on data page 3, they are separated by a record having an attribute value equal to "P".

Even if an index is clustered to begin with, the index and table may become disordered as a result of rows being added or deleted from the table. Specifically, if a new data row is to be added to a table, then this data would preferably be added on the data page for the key interval of the index in which the data row falls. However, there may be no or insufficient free space on this data page to accommodate the new record, and the data row may, as a result, have to be stored on another data page on which sufficient free space is available, or appended to the end of the table. Accordingly, even if an index is clustered to begin with, it may become unclustered, at least to some extent, as additional information is added. The extent to which a clustered index has become unclustered is measured by the cluster factor; the cluster factor is measured on a scale of 0 to 1, where 1 means the index is fully clustered.

A clustering index is an index whose cluster factor is, as much as possible, maintained or improved dynamically as data is inserted into the associated table. The cluster factor is maintained or improved by inserting new rows as physically close to the rows for which the key values of this index are in the same range, as is possible. Having a high cluster factor—a cluster factor close to 1—increases data retrieval efficiency when such retrieval involves accessing sequential ranges of that index's values.

When inserting a row into a table in a relational database management system (RDBMS), a search for free space must be done to find space for the row being inserted. Free space maps are used in the art to keep track of the free space that is available in a table. A free space map is a map or directory of the pages in a table, together with an approximation of the amount of the free space on each of these pages. This enables the pages that might have enough space for a record to be quickly looked for, without requiring the page to actually be fixed.

A free space map spans a plurality of free space map pages when it is too large to accommodate on a single page. A free space map page is one of the plurality of free space map pages containing a portion of the map. Each free space map page includes an array of free space entries for a series of pages that form part of the table. By fixing one free space map page, it is possible to scan through space information from many pages in the actual data files, in order to find a page that potentially has enough space for a record to be inserted. Each entry in the free space map page indicates the approximate amount of free space available in the page index in the array. When a row is to be inserted, the free space map is searched for a data page with sufficient free space to hold the record. The search usually starts at the beginning of the free space map, or from the position where space was last found in this free space map. In either case, the entire free space map is usually searched until a data page with sufficient free space is found or until the entire free space map has been searched. If a page with free space is found, the row is inserted on to the page. If no free space is found, the row is appended to the table.

A record, which is being inserted into a table having a clustering index defined on A one or more of its columns, should preferably be inserted on the target page in order to maintain or improve the cluster factor. The target page is the ideal page on which to insert a new data record into a table that has a clustering index, as this page contains the same or next key value in the table as that being inserted. However, this may not always be possible as the target page may have insufficient free space to accommodate the record. If there is insufficient space for the record on the target page, then the record must be inserted on another page on the table.

Accordingly, there remains a need for a method for efficiently searching for free space in a table of a DBMS or RDBMS that has a clustering index, which method is both efficient and facilitates clustering.

SUMMARY OF THE INVENTION

An object of one aspect of the present invention is to provide an improved database management system.

Preferred embodiments provide an improved method, system, and program for determining a location in a database to insert a new record in a database table when the new record includes a key value. A determination is made of a target page having a record in the table that includes a key value that equals the key value of the new record. The pages in storage are capable of storing records from the table. The new record is stored in the target page if the target page has sufficient free space to store the new record. A determination is made of a page closest to the target page that has sufficient free space to store the new record if the target page does not have sufficient space. The new record is stored in the determined closest page if the target page does not have sufficient free space.

In accordance with further aspects of the preferred embodiments, there is provided a method for searching a table for free space for inserting a new record into the table in a database management system. The table resides in a storage medium, and comprises a series of table pages capable of storing a plurality of records. The table has a clustering index defined in a column of the table. The new record has a new attribute for storing in the column when the new record is stored in the table. The method includes the step of searching for a target page in a series of target pages. The target page is selected to include a target record having a target attribute stored in the column of the table. The target attribute is selected to be equal to the new attribute if the column contains a record equal to the new record, otherwise, the target attribute is selected to be either a next higher attribute above the new attribute and stored in the column, or a next lower attribute below the new attribute and stored in the column. The method also comprises the step of searching the target page for sufficient free space to accommodate the new record. If sufficient free space is found on the target page, then the method inserts the new record on the target page. If sufficient free page is not found on the target page, then the method searches the target neighborhood of pages in a series of table pages. The target neighborhood of pages surround the target page. If sufficient free space is found on a page in the target neighborhood of pages, then the new record is inserted on to the page in the target neighborhood of pages. If sufficient free space is not found in the target neighborhood of pages, then the method searches for sufficient free space to accommodate the new record in the series of table pages outside the target neighborhood of pages. If sufficient free space is found outside the target neighborhood of pages, then the new record is inserted on a non-neighboring page outside the target neighborhood of pages. If sufficient free space is not found outside the target neighborhood of pages, then a new page having a new record is appended to the end of the table.

In accordance with a second aspect of the preferred embodiments, there is provided a method for searching a table for free space for inserting a new record into the table in a database management system. The table resides in a storage medium, and includes a series of table pages capable of storing a plurality of records. The table also has a clustering index defined in a column of the table. The method includes a step of searching a set of table pages in the series of table pages. If sufficient free space is found in the set of table pages, then the record is inserted in the set of table pages. If the set of table pages includes a single page having sufficient free space to accommodate the new record, then the new record is inserted on to the single page. If the set of table pages includes at least two pages having sufficient free space to accommodate the new record, then the new record is inserted on an emptiest page in the at least two pages. If sufficient free space is not found on the set of table pages, then the new page having the new record is appended to the end of the table.

In accordance with a third aspect of the preferred embodiments, there is provided a computer program product for use on a computer system wherein transactions are executed for inserting data into a table in a database system. The table resides in a storage medium, and comprises a series of table pages capable of storing a plurality of records. The table also has a clustering index defined on a column of the table. The new record has a new attribute for storing in the column of the table when the new record is stored in the table. The computer program product includes a recording means and means recorded on the medium for instructing the computer system to perform the following steps. The computer system searches for a target page in a series of target pages. The target page is selected to include a target record having a target attribute stored in the column of the table. The target attribute is selected to be equal to the new attribute if the column contains a record equal to the new record, otherwise, the target attribute is selected to be either a next higher attribute above the new attribute and stored in the column, or a next lower attribute below the new attribute and stored in the column. The computer system searches the target page for sufficient free space to accommodate the new record. If sufficient free space is found on the target page, then the computer system inserts the new record on the target page. If sufficient free page is not found on the target page, then the computer system searches the target neighborhood of pages in a series of table pages. The target neighborhood of pages surround the target page. If sufficient free space is found on a page in the target neighborhood of pages, then the new record is inserted on to the page in the target neighborhood of pages. If sufficient free space is not found in the target neighborhood of pages, then the computer system searches for sufficient free space to accommodate the new record in the series of table pages outside the target neighborhood of pages. If sufficient free space is found outside the target neighborhood of pages, then the new record is inserted on a non-neighboring page outside the target neighborhood of pages. If sufficient free space is not found outside the target neighborhood of pages, then a new page having a new record is appended to the end of the table.

In accordance with a fourth aspect of the preferred embodiments, there is provided a computer program product for use on a computer system, wherein transactions are executed for inserting data into a table in a database. The table resides in a storage medium and comprises a series of table pages capable of storing a plurality of records. The table has a clustering index defined on a column of the table. The computer table product comprises a recording medium, and means recorded on the medium for instructing the computer system to perform a number of steps. The computer system searches a set of table pages in the series of table pages. If sufficient free space is found in the set of table pages, then the record is inserted in the set of table pages. If the set of table pages includes a single page having sufficient free space to accommodate the new record, then the new record is inserted on to the single page. If the set of table pages includes at least two pages having sufficient free space to accommodate the new record, then the new record is inserted on an emptiest page in the at least two pages. If sufficient free space is not found on the set of table pages, then the new page having the new record is appended to the end of the table.

In accordance with a fifth aspect of the preferred embodiments, there is provided a data processing system for inserting data into a table in a database system. The table resides in a storage medium, and comprises a series of table pages capable of storing a plurality of records. The table also has a clustering index defined on a column of the table. The new record has a new attribute for storing in the column of the table when the new record is stored in the table. The computer system searches for a target page in a series of target pages. The target page is selected to include a target record having a target attribute stored in the column of the table. The target attribute is selected to be equal to the new attribute if the column contains a record equal to the new record, otherwise, the target attribute is selected to be either a next higher attribute above the new attribute and stored in the column, or a next lower attribute below the new attribute and stored in the column. The computer system searches the target page for sufficient free space to accommodate the new record. If sufficient free space is found on the target page, then the computer system inserts the new record on the target page. If sufficient free page is not found on the target page, then the computer system searches the target neighborhood of pages in a series of table pages. The target neighborhood of pages surround the target page. If sufficient free space is found on a page in the target neighborhood of pages, then the new record is inserted on to the page in the target neighborhood of pages. If sufficient free space is not found in the target neighborhood of pages, then the computer system searches for sufficient free space to accommodate the new record in the series of table pages outside the target neighborhood of pages. If sufficient free space is found outside the target neighborhood of pages, then the new record is inserted on a non-neighboring page outside the target neighborhood of pages. If sufficient free space is not found outside the target neighborhood of pages, then a new page having a new record is appended to the end of the table.

In accordance with a sixth aspect of the preferred embodiments, there is provided a data processing system for inserting data into a table in a database system. The table resides in a storage medium, and comprises a series of table pages capable of storing a plurality of records. The table also has a clustering index defined on a column of the table. The computer system searches a set of table pages in the series of table pages. If sufficient free space is found in the set of table pages, then the record is inserted in the set of table pages. If the set of table pages includes a single page having sufficient free space to accommodate the new record, then the new record is inserted on to the single page. If the set of table pages includes at least two pages having sufficient free space to accommodate the new record, then the new record is inserted on an emptiest page in the at least two pages. If sufficient free space is not found on the set of table pages, then the new page having the new record is appended to the end of the table.

BRIEF DESCRIPTION OF THE DRAWINGS

Reference will now be made to the accompanying drawings that show, by way of example, preferred embodiments of the present invention and in which:

FIGS. 15 and 16 show free space map pages suitable for being searched by the record insertion method of the present invention;

FIG. 17 is a pseudo code listing for finding the target page for a key value in a clustering index according to the method of FIGS. 2 and 3;

FIG. 18 is a pseudo code listing for searching the target free space map according to the method of FIGS. 4 to 7;

FIG. 19 is a pseudo code listing for determining the next page and offset in a spiral search of the target free space map pages according to the method of FIG. 8;

FIG. 20 is a pseudo code listing for a worst fit process for searching a non-target free space map page according to the method of FIGS. 11 to 14;

DETAILED DESCRIPTION OF THE PREFERRED EMBODIMENTS

Figure 1:
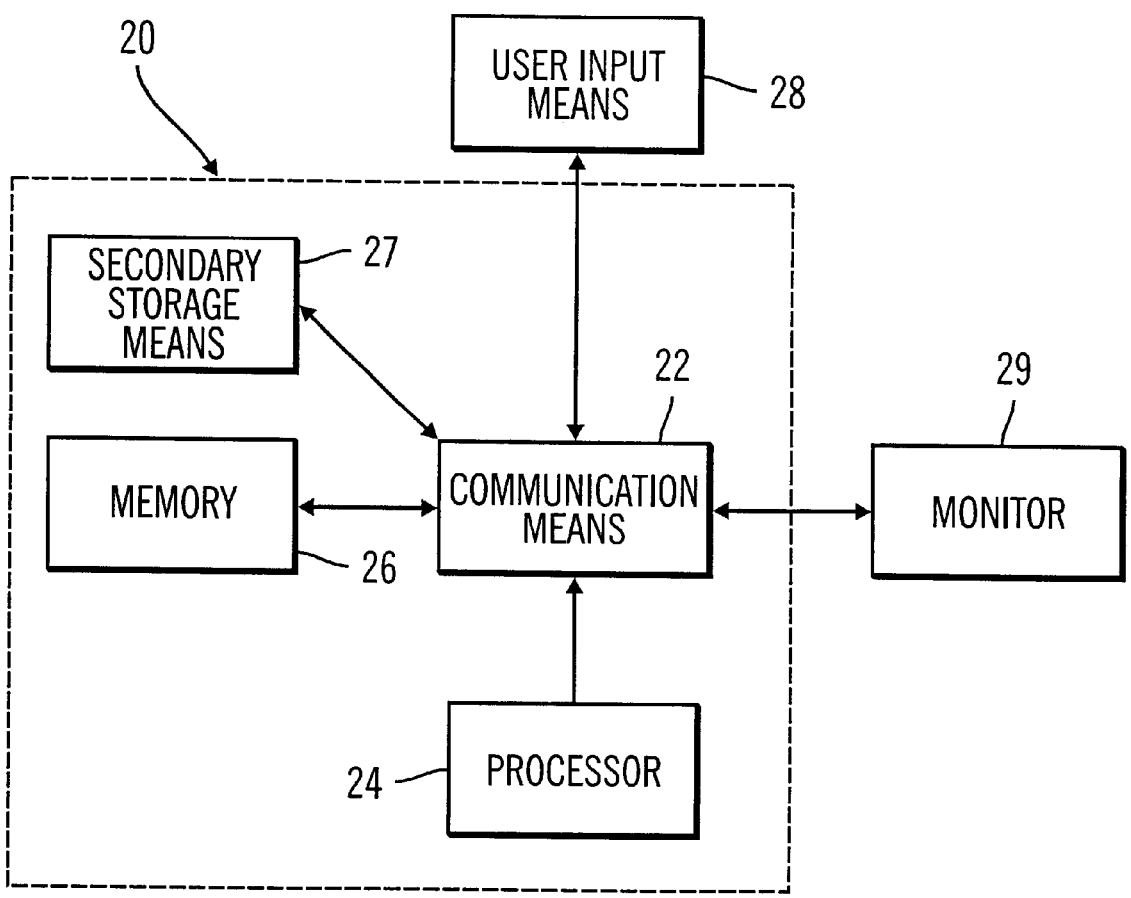
FIG. 1, in a block diagram, illustrates a computer system that may be configured to implement an embodiment of the invention.

Referring to FIG. 1, there is illustrated a computer system 20 on which a preferred embodiment of the present invention can be implemented. The computer system 20 includes a communication means 22 for communicating information and a processor 24 that is connected to the communication means 22.

The computer system 20 further comprises a memory 26 for storing data records and instructions regarding the manipulation of such data records, and a secondary storage means 27 such as a disk drive or hard drive. The memory 26 is connected to the processor 24 via the communication means 22 as are the user input means 28, such as a keyboard or mouse, and a monitor 29. In the preferred embodiment, the present invention relates to the use of the computer system 20 implements database management system in which free space searching for a new record in searching is executed in a way that enhances clustering.

Figure 9:
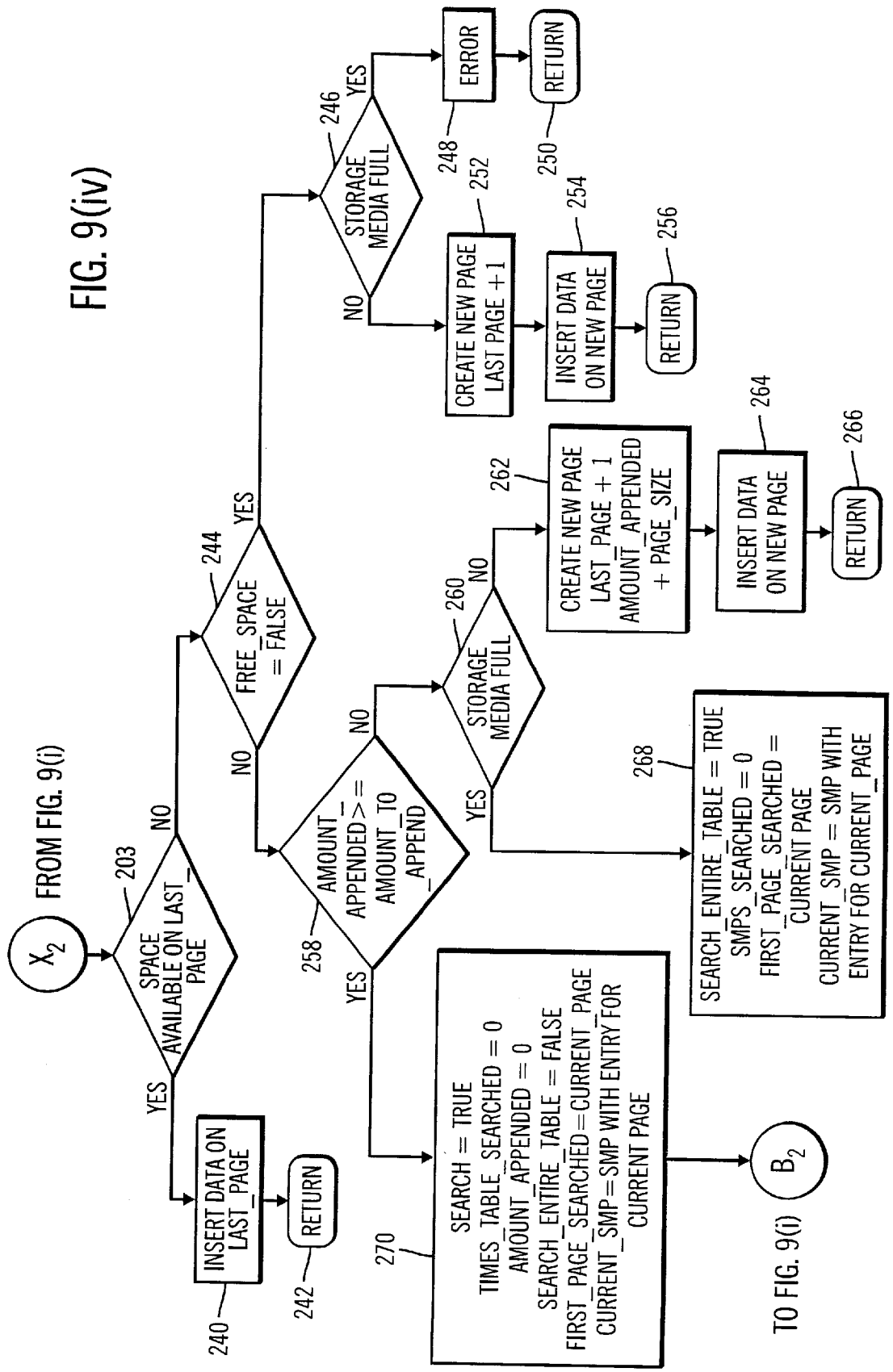
FIGS. 9(i) to 9(v) show flowcharts illustrating a method for efficiently searching free space in a relational database management system in accordance with an aspect of the invention.
Figure 10:
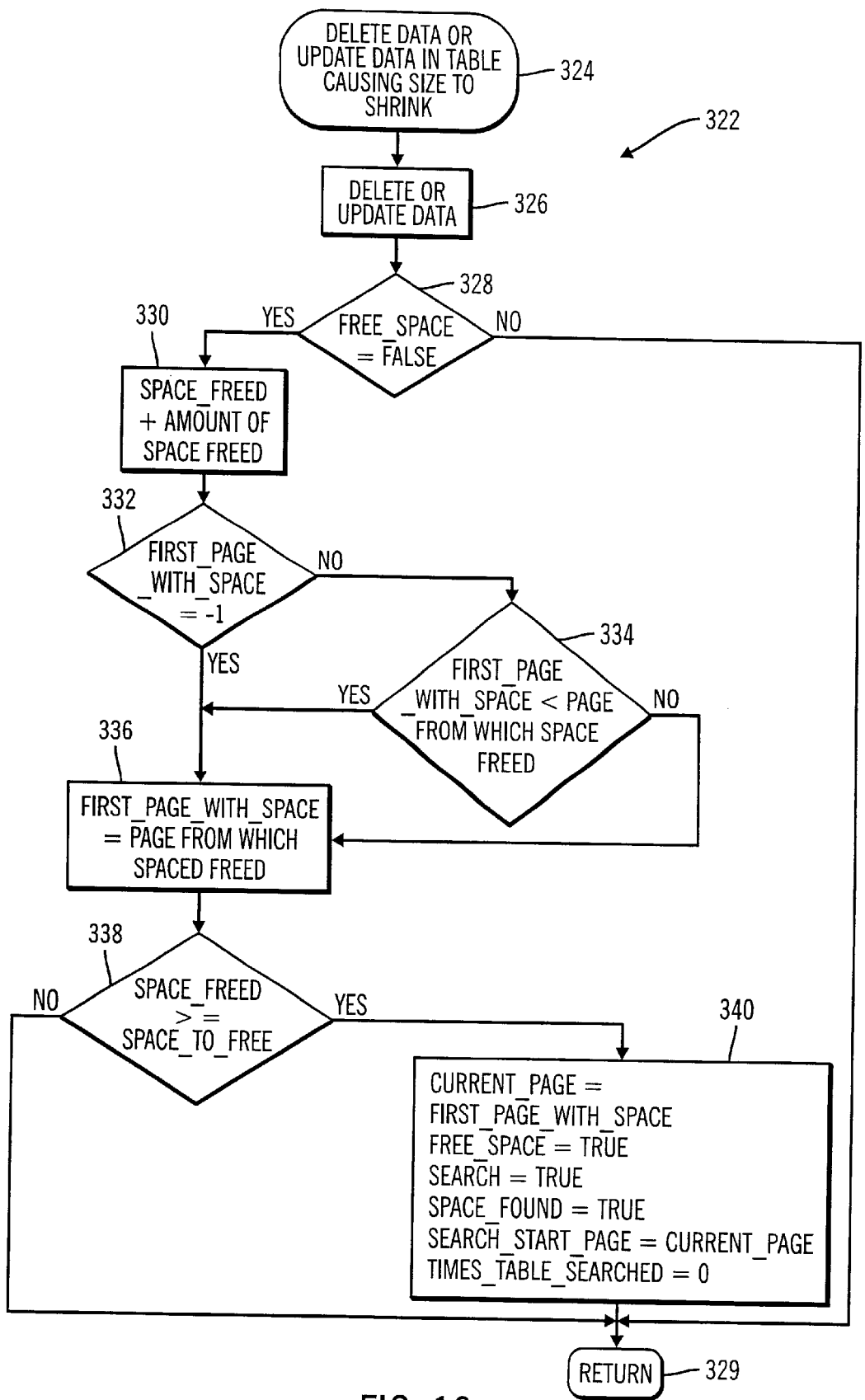
FIG. 10 shows a flowchart illustrating a method utilized by the method of FIG. 9 to account for data updates and deletions to the table.

Referring to the flowcharts of FIGS. 2 to 14 there are illustrated different stages of a method of inserting a record into a table having a clustered index defined on one of its columns. In the first stage, a target page is selected in the index based on the key value of the record to be inserted; an example of this stage of the record-insertion method is illustrated by the flow charts of FIGS. 2 and 3. Next, in a second stage of the record insertion method, an example of which is illustrated in the flowcharts of FIGS. 4 to 8, the free space map page (FSMP) for the target page is determined. This target FSMP represents the target page as well as a set of neighboring pages. The target FSMP is then searched for pages having sufficient space to accommodate the new record. If the target FSMP indicates that there is room for the new record on any of the pages represented by the target FSMP, then the actual pages are checked and if there actually is enough room, the new record is inserted on one of these pages. If the target FSMP indicates that there is no room for the new record on any of these pages, the method proceeds to the third stage in which free space for the new record is sought elsewhere in the table. FIGS. 9 to 10 illustrate a method of searching non-target FSMPs in accordance with an aspect of a third stage of the invention. The flow charts of FIGS. 11 to 14 illustrate the fourth stage of the record insertion method according to a preferred aspect of the invention, in which a worst fit selection is made from among the pages having enough space to accommodate the new record being inserted Preferably, if the target page does not have sufficient free space to accommodate the record, the page on which the record is inserted should be as close to the target page as possible, so that during range scans of the index there is an increased likelihood of sequential pages in the range being pre-fetched together. However, if it is not possible to insert the record on a page in the general neighborhood of the target page, then other considerations become important. First, it is important that the table be searched as efficiently as possible for pages having sufficient free space to accommodate the record. FIGS. 9 and 10 illustrate a method for efficiently searching for free space to accommodate the record. Second, the record should be inserted in such a way that its likelihood of disrupting future attempts to maintain or improve the cluster factor when new records are inserted is minimized. FIGS. 11 to 14 illustrate a free space selection method according to one aspect of the present invention in which a worst fit selection is made from among the pages having enough free space to accommodate the new record being inserted.

Figure 21:
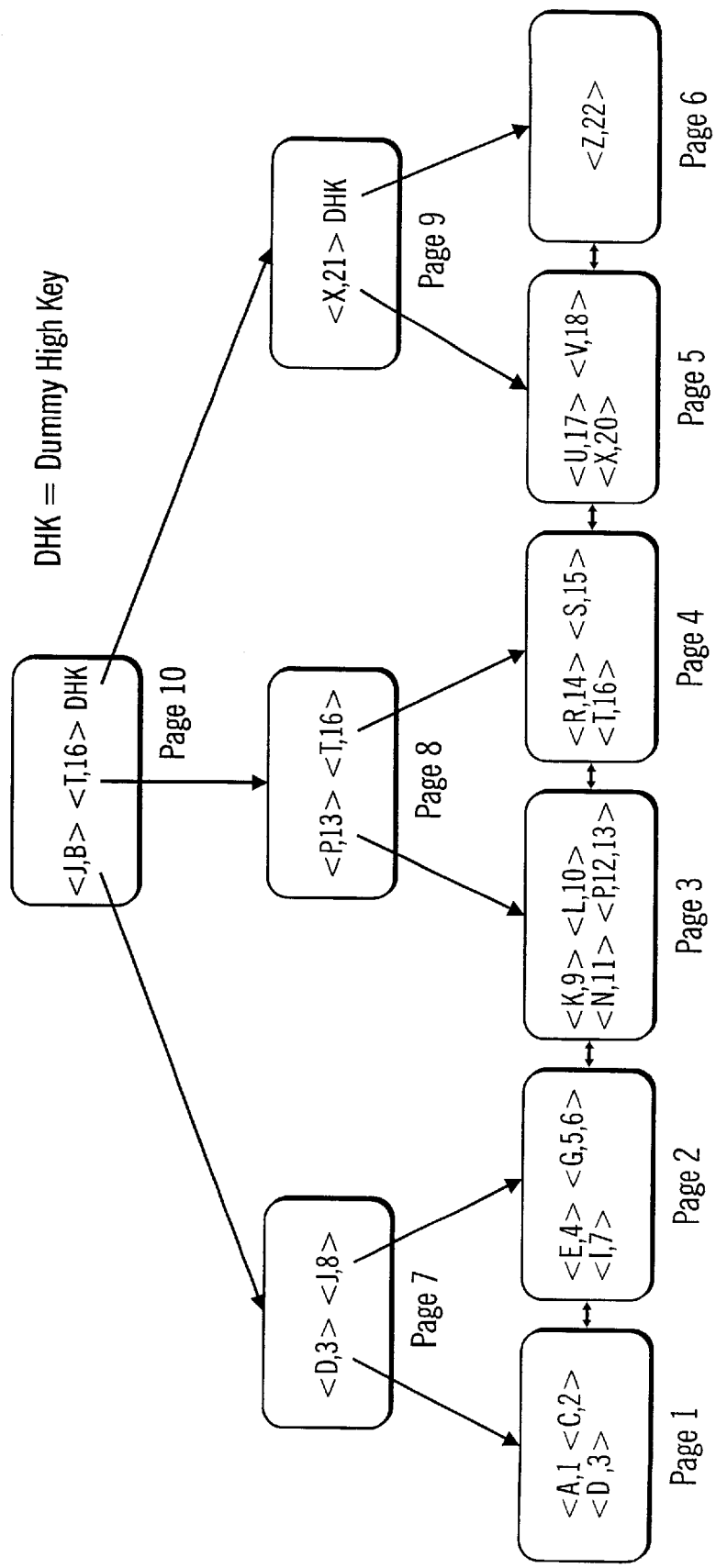
FIG. 21 shows a clustering B-tree index according to the prior art.
Figure 22:
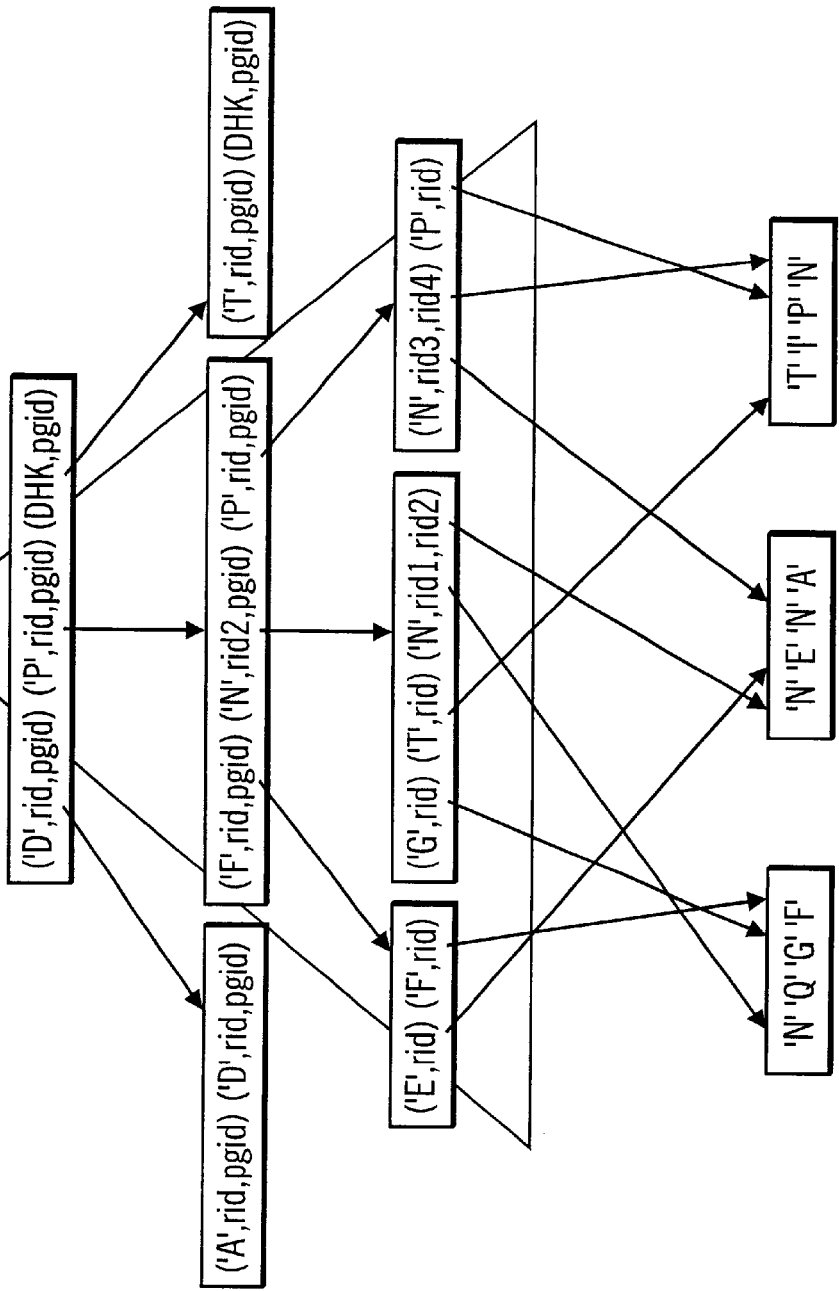
FIG. 22 shows a unclustered B-tree index according to the prior art.
Figure 23:
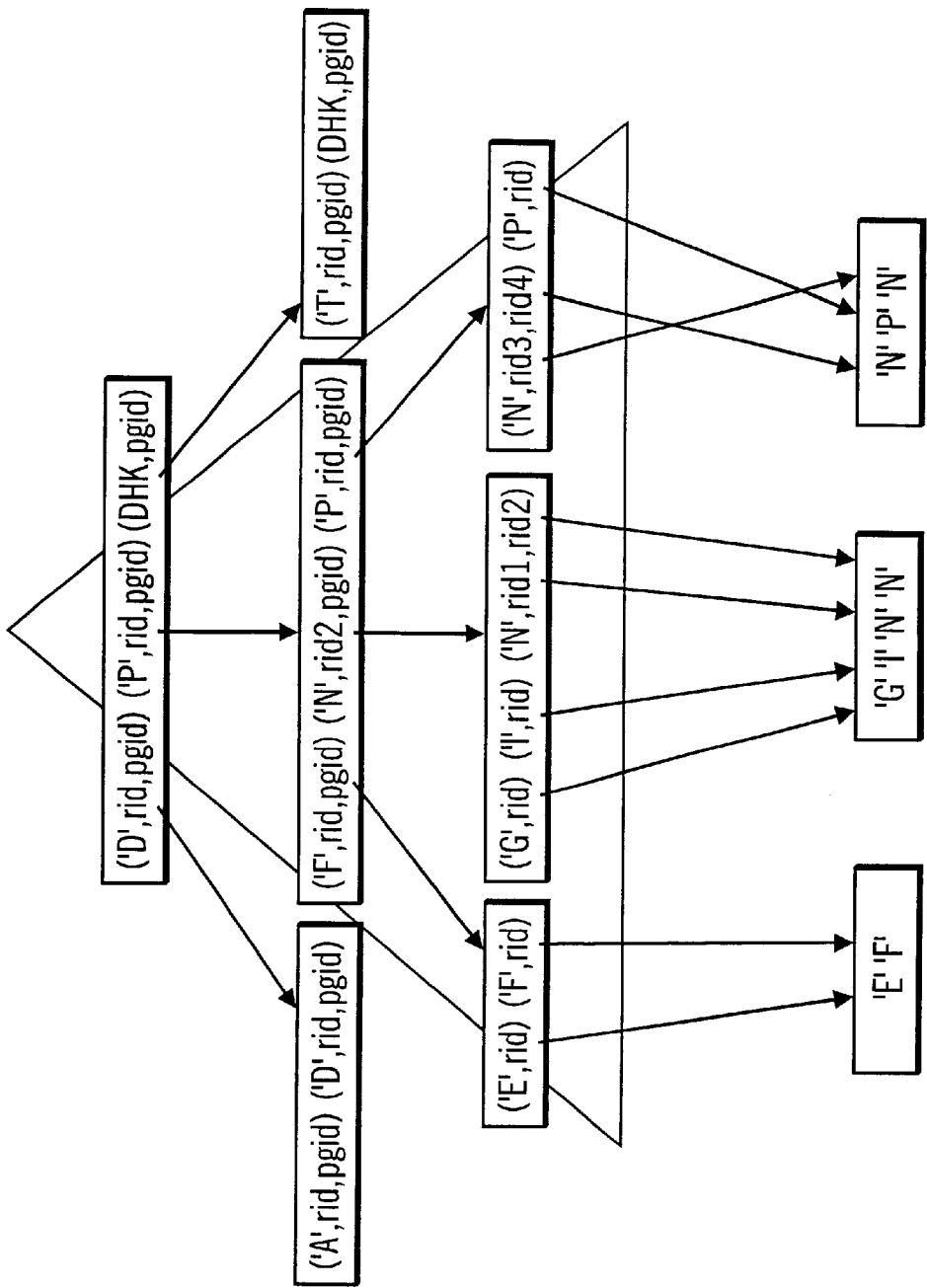
FIG. 23 shows a clustered B-tree index according to the prior art.

Referring to FIG. 21, there is illustrated a clustering B-tree index according to the prior art. In the description that follows, the flowcharts of FIGS. 2 to 7 are described with reference to an example in which the index of FIG. 21 is searched for free space in which to insert a new record.

Figure 2:
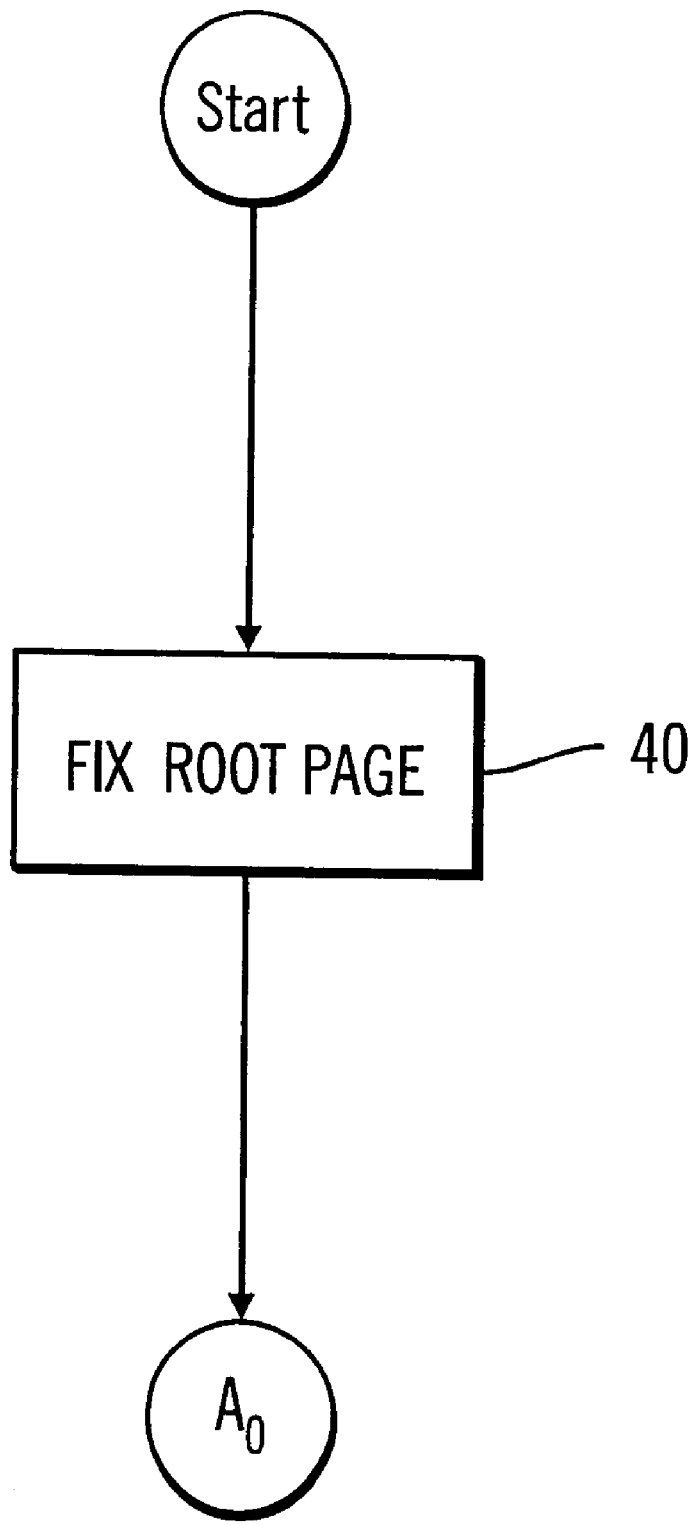
FIG. 2 is an initializing flow chart in which the root page of a clustering index is fixed in accordance with a target page finding procedure of an aspect of the invention.

Referring to FIG. 2, there is illustrated a start or initialization flow chart in which the root page of a clustering index is fixed in step 40. The target page finding procedure then proceeds to point $A_0$ at the top of the flow chart of FIG. 3.

Assume that a record having the key value "J" is being inserted in the table for the clustering index. Then, according to step 40 of the flow chart of FIG. 2, the record insertion method begins with the root page, page 10, of the clustering B-tree index at FIG. 21 being fixed. After page 10 is fixed, the record insertion method proceeds to point $A_0$ at the top of the flow chart of FIG. 3. Query 42 returns the answer "No", as page 10 is not a leaf page or node, and the record insertion method proceeds to step 44. In step 44, an attempt is made to find the key value "J" on page 10, resulting in the key <J,8> being located. Query 48 returns the answer "Yes" as the key <J,8> has been found, and the record insertion method proceeds to step 50 in which the child page, to which pointer <J,8> points, is fixed—this child page is page 7. If page 7 is valid, then query 54 returns the answer "Yes". If page 7 is not valid, then query 54 will return the answer "No" and the index will be latched again in step 52. Similarly, if a key is not found in step 44, then query 48 will return the answer "No", and the index will be latched again in step 46. When query 44 returns the answer "Yes", the record insertion method proceeds back to point $A_0$ at the top of FIG. 3.

Figure 3:
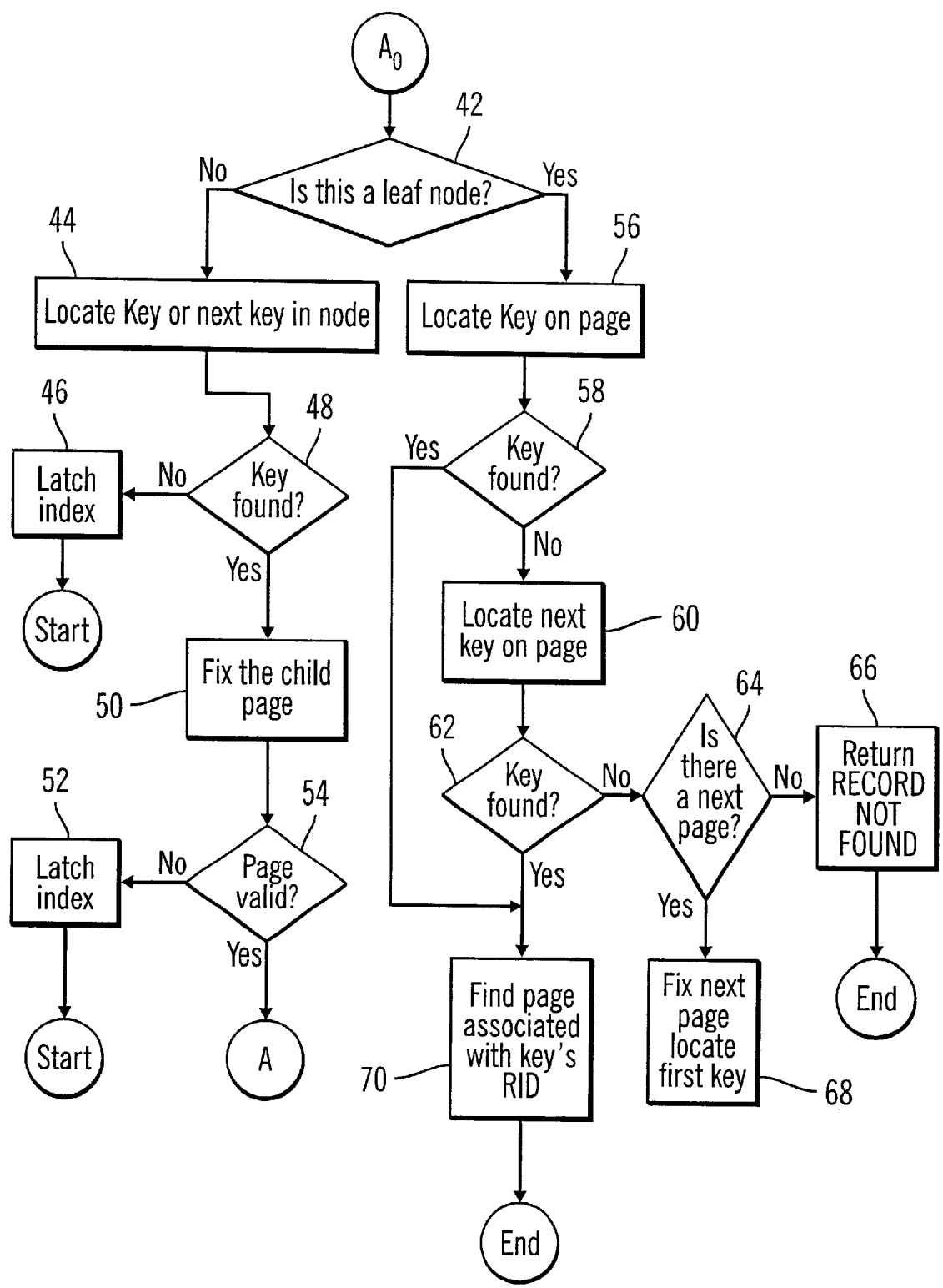
FIG. 3 is a flow chart showing steps in the target page finding procedure of FIG. 2 after the root page of a clustering index has been fixed.

On this next run through the flow chart of FIG. 3, query 42 returns the answer "No" again, as page 7 is not a leaf page and the record insertion method proceeds through the left-hand side of the flow chart of FIG. 3 in much the same way as it did on the first run. Specifically, in step 44, the key <J,8> is located, and child page 2 is fixed in step 50. Query 54 then returns the answer "Yes" and the record insertion method proceeds back to point $A_0$ at the top of the flow chart of FIG. 3. This time through the flow chart of FIG. 3, query 42 returns the answer "Yes", as page 2 is a leaf page. In step 56, page 2 is unsuccessfully searched for the key value "J". Query 58 then returns the answer "No" and the record insertion method proceeds to step 60. In step 60, page 2 is searched for the next higher key on the page after key value "J"; however, page 2 does not include such a key, and query 62 accordingly returns the answer "No". The record insertion method then proceeds to query 64, which returns the answer "Yes" as there is a next page, page 3. In step 68, the next page, page 3, is fixed, and the first key on this next page is located. This key is key <K,9>. As "J" is not in the index and "K" is the next higher value, page 3 is selected as the target page for the insert.

In step 70, the page associated with the RID of key <K,9> is determined. The RID of key <K,9> is "9"; accordingly, data page 9 is determined to be the target page or the ideal page on which to insert the new record. If a key having key value "J" had been found, then the flow chart of FIG. 3 would have proceeded directly to step 70 from query 58, and data page associated with such key's RID would have been determined to be the target page. After step 70 is executed, the flow chart of FIG. 3 ends, as does the first stage of the record insertion method in which the target page is determined. If page 2 had been the last key in the index and did not contain a key having key value "J", then query 64 would have returned the answer "No", and, in step 66, the record insertion method would have returned the result "RECORD NOT FOUND" before the method of the flow chart of FIG. 3 ended.

Referring to FIG. 17, the various steps and queries of the flowcharts of FIGS. 2 and 3 are represented in pseudo code.

FIGS. 4 to 7 illustrate a second stage in the record insertion method according to a preferred aspect of the present invention. In this stage, the target page has been determined, and the target page as well as pages surrounding the target page are searched for sufficient free space to accommodate the record being inserted. If the target page 9 can accommodate the new record being inserted, then the record is inserted on page 9, and the record insertion method ends in that case at this second stage If, however, there is insufficient space for the record on the target page, then the record must be inserted on another page in the table.

First, the pages immediately surrounding the target page are searched in an order corresponding to their proximity to the target page—pages that are closer to the target page being searched before pages that are further away from the target page. Preferably, the new record should be inserted on a page that is as close to the target page as possible, so that during range scans of the index there is a greater likelihood of sequential pages in the range being pre-fetched together.

As it is preferable that pages not be fixed unnecessarily when searching the pages for sufficient free space to accommodate the record, a free space map is used to get an idea of which pages are likely to have enough space for the record. Accordingly, the FSMP that contains information for target page 9 is determined close to the beginning of this stage of the record insertion method.

Figure 4:
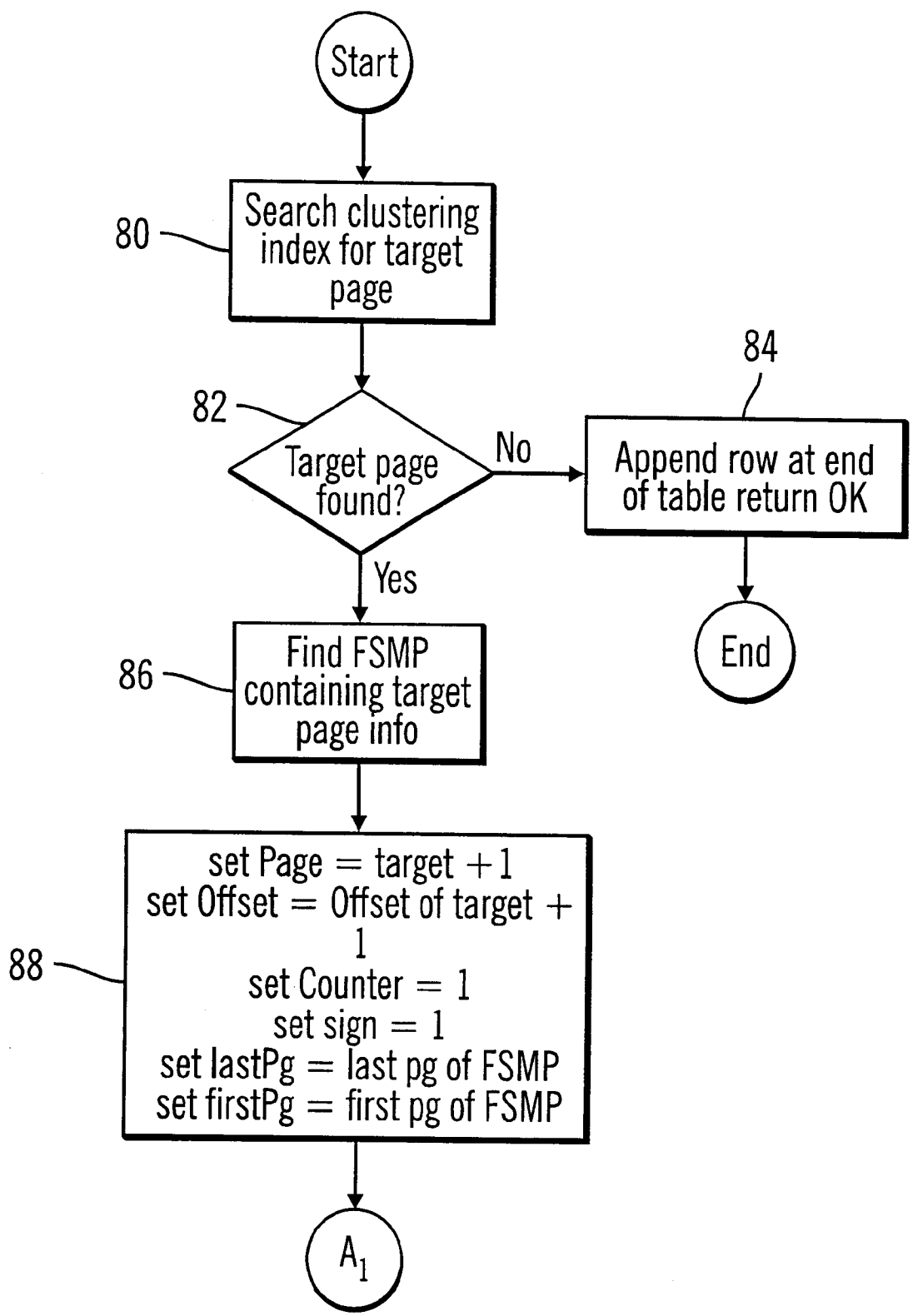
FIGS. 4 to 8 are flow charts showing steps in a method of searching a target free space map page in accordance with an aspect of the invention.

The process by which the target FSMP is searched is illustrated beginning in the flow chart of FIG. 4. The flowcharts of FIGS. 2 and 3 are subsumed in step 80 of the flow chart of FIG. 4, in which the clustering index is searched for a target page, and is determined to be target page 9, as this is the page designated by key <K,9>. Query 82 then returns the answer "Yes" as the target page has been found and the FSMP containing information target page 9 is located in step 86.

The way in which the target FSMP stores information regarding each page is represented in the diagram of FIG. 15. Assume, for the purposes of this example, that target page 9 is found at offset 3 in the target FSMP. Accordingly, as shown in the diagram, there are 10 free space bytes available on target page 9.

In step 88 of the flow chart of FIG. 4, the location of the page offset representing the target page in the FSMP is used to initialize certain variables. These variables are Page, Offset, Counter, Sign, lastPage, and firstPage. Specifically, Page is set equal to target plus 1; as target page 9 is represented by page offset 3, Page is set equal to 4. Offset is then set equal to the offset of the target plus 1; in this example, the offset of the target is 3, so Offset is set equal to 3 plus 1 or 4. Counter is set equal to 1 and Sign is set equal to 1. LastPage is set equal to 9 or the highest page offset in the FSMP represented by the diagram of FIG. 15, and firstPage is set equal to 0, which is the lowest page offset of the target FSMP as represented by the diagram of FIG. 15. The record insertion method then proceeds to point A, at the top of the flow chart of FIG. 5.

In query 90, the current page is checked to make sure that it is still on the target FSMP. In this case, the Page is set equal to 4, and the lastPage is set equal to 9, while firstPage is set equal to 0. Accordingly, query 90 returns the answer "Yes", as 4 is greater than 0 and less than 9. In query 92, the free space value for offset 4 is determined; as shown in FIG. 15, the free space value for offset 4 is two bytes. Say that the record being inserted requires 11 bytes, then query 92 will return the answer "No" and the record insertion method will move to the next page in a spiral fashion in step 100. This movement to the next page in spiral fashion is illustrated in the flow chart of FIG. 8. In step 140 of the flowchart of FIG. 8, Counter is incremented to 2, as this will be the second attempt to find space for the record on the data pages represented by the target FSMP, and Sign, which was formerly 1, becomes −1. In step 142, Page is set equal to the former value of Page plus the Counter multiplied by the Sign. In this case, as the former value of Page was 4, Counter is set equal to 2, and Sign is set equal to −1, the new value of Page is 2. In step 144, Offset is set equal to the former value of Offset plus Counter multiplied by Sign; as the former value of Offset was 4, Counter is set equal to 2, and Sign is set equal to −1, the new value of Offset is 2. Step 100 of the flow chart of FIG. 5 having being completed, the record insertion method proceeds to point A1 at the top of FIG. 5 once again.

On the second run through the flow chart of FIG. 5, query 90 again returns the answer "Yes", as 2, the current value of Page, is greater than 0 (firstPg) and less than 9 lastPg). Query 92 returns the answer "No", as according to FIG. 15, the free space available for page offset 2 is only 5 bytes, and 11 bytes are required. The record insertion A method then proceeds to step 100, and to the flow chart of FIG. 8—in which Sign is set equal to 1, Counter equal to 3, Page equal to 5, and Offset equal to 5—for the next run through the flow chart of FIG. 5. In this manner, the offsets are checked in the following spiral manner or order: 3, 4, 2, 5, 1, 6, 0, 7. As is apparent from the order of this sequence, pages that are closer to the target page are checked first, and only if there is no free space on these target pages does the search proceed to pages that are further away. After the free space at page offset 7 has been determined to be insufficient to accommodate the new record being inserted, the record insertion method proceeds back to step 100, and to the flow chart of FIG. 8, in which the sign is set equal to −1, the counter equal to 8, the Page equal to −1, and the offset equal to −1. Then, the record insertion method proceeds back to point A, at the top of the flow chart of FIG. 5.

Figure 5:
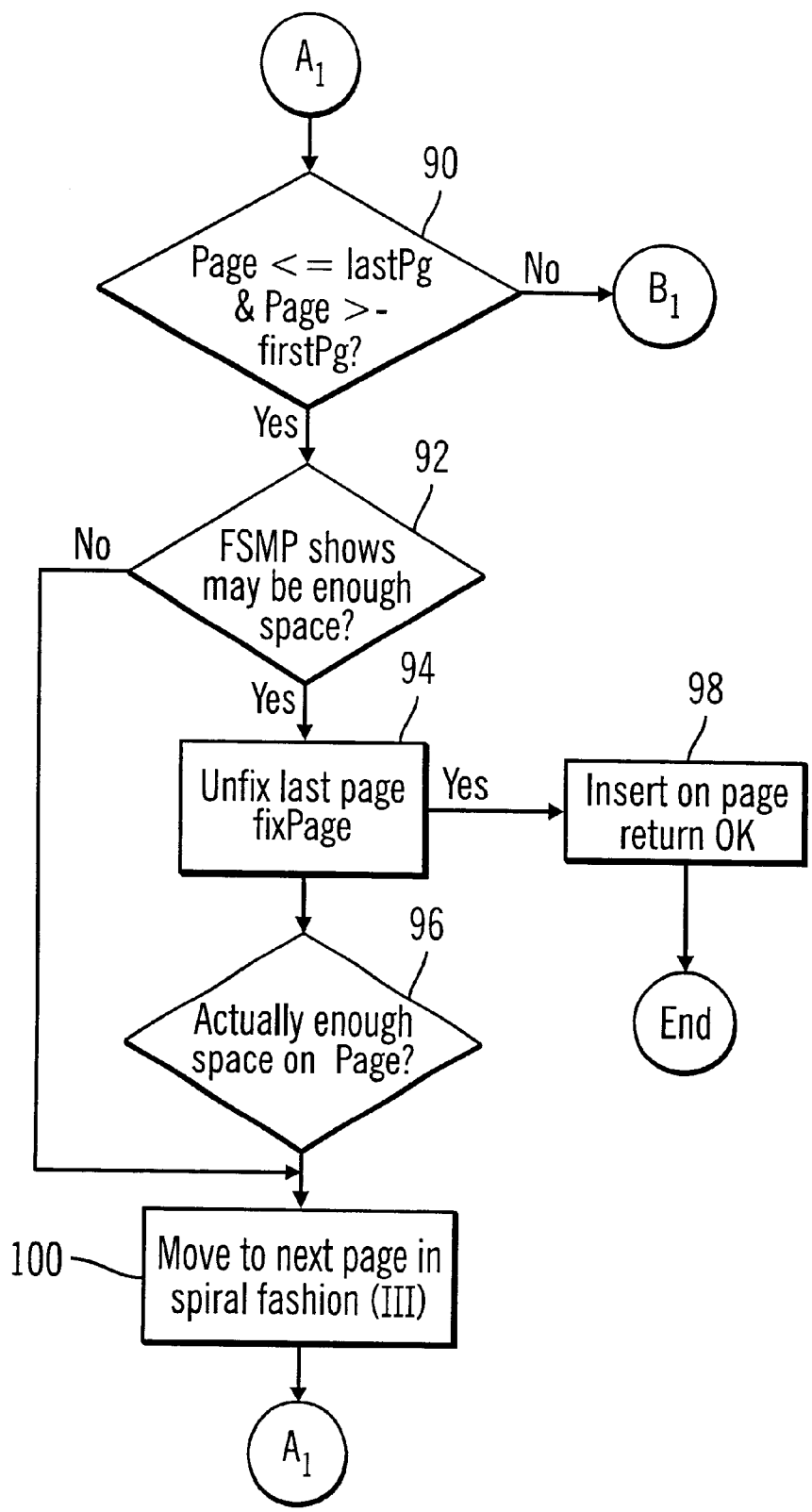

In the next run through the flow chart of FIG. 5, query 90 will return the answer "No" as the Page value of −1 fails the test that Page be greater than or equal to firstPg, as firstPg equals 0. Accordingly, query 90 returns the answer "No", and the record insertion method proceeds to point $B_1$ at the top of the flow chart of FIG. 6.

Figure 6:
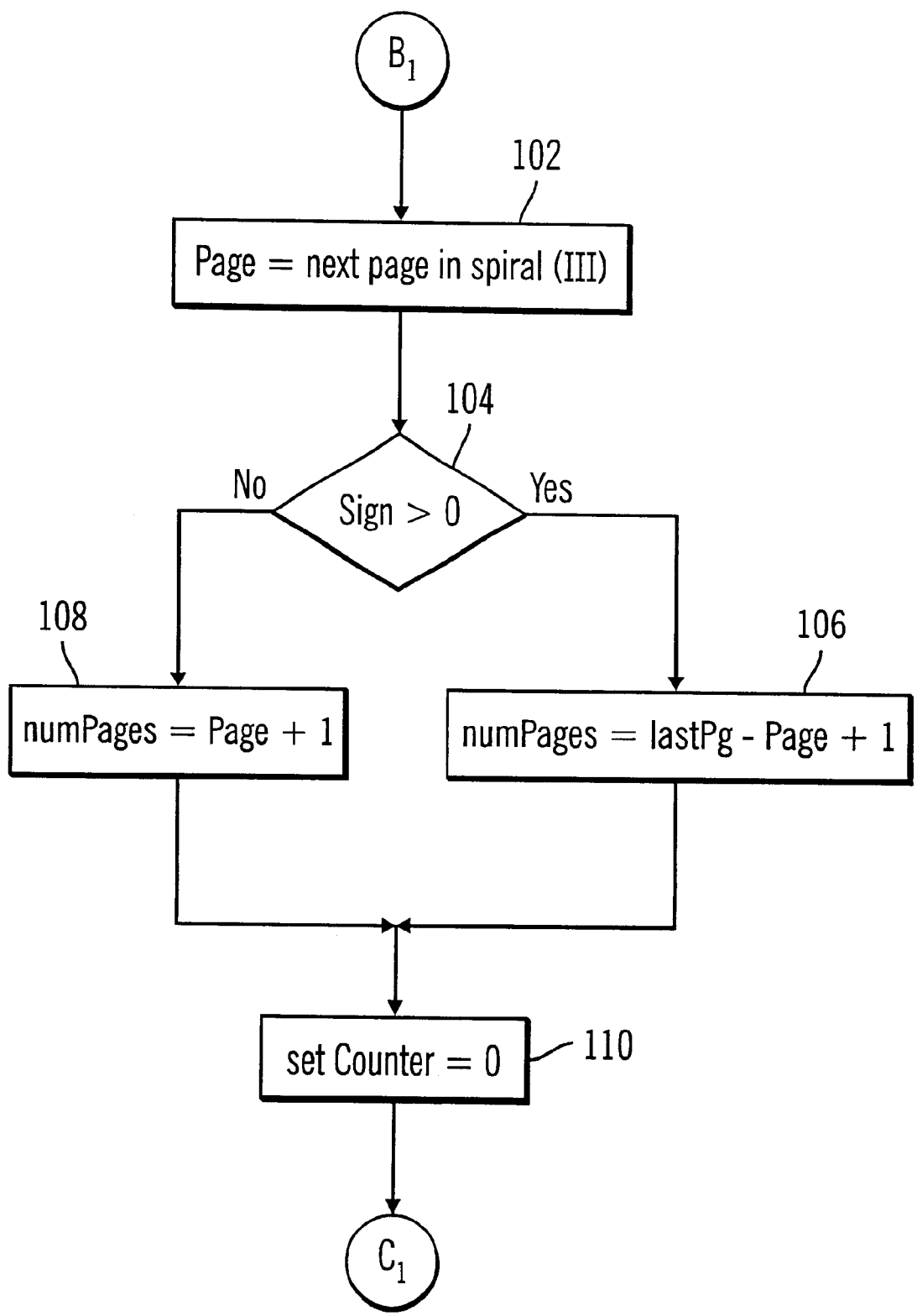
Figure 7:
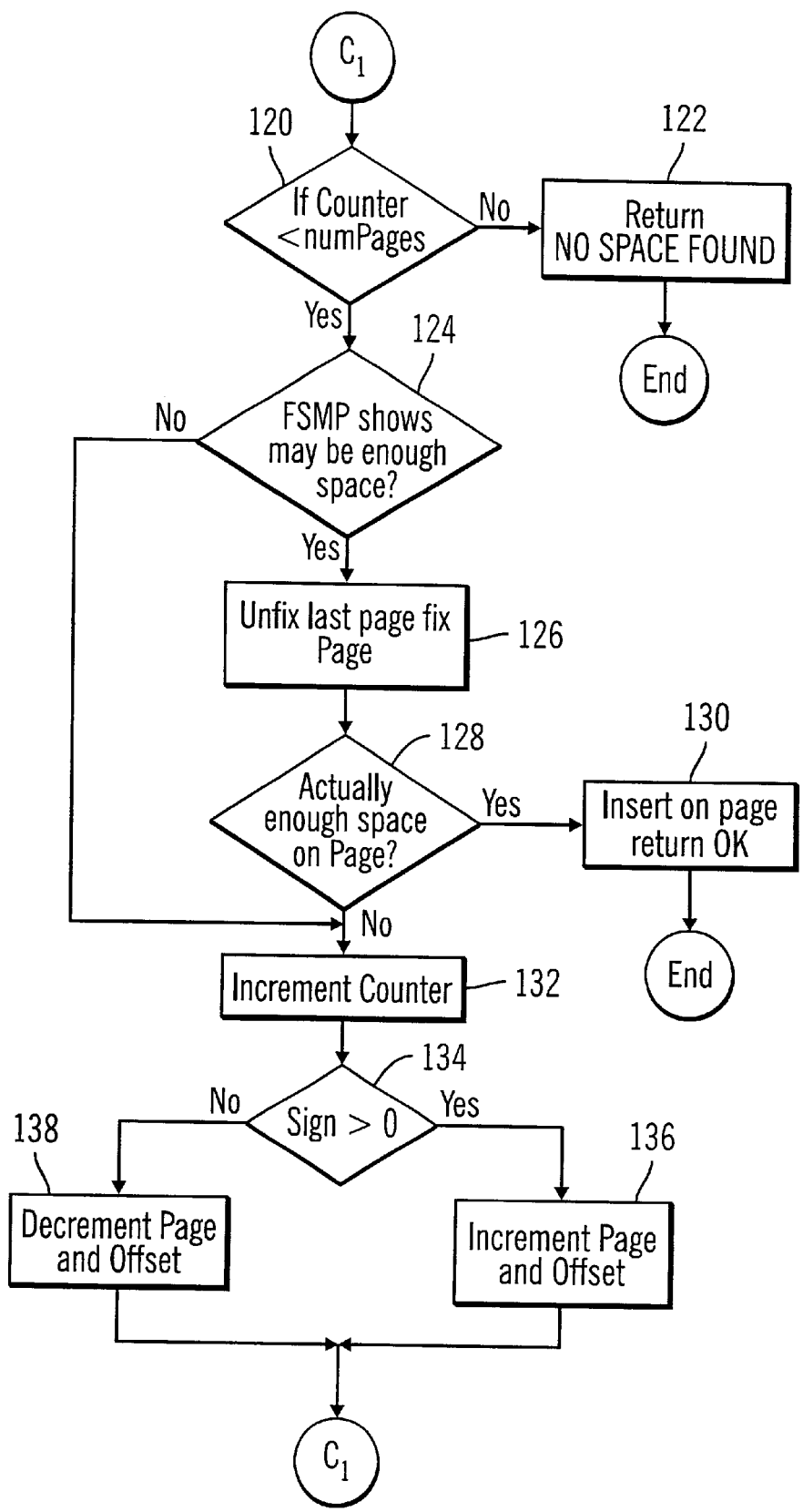
Figure 8:
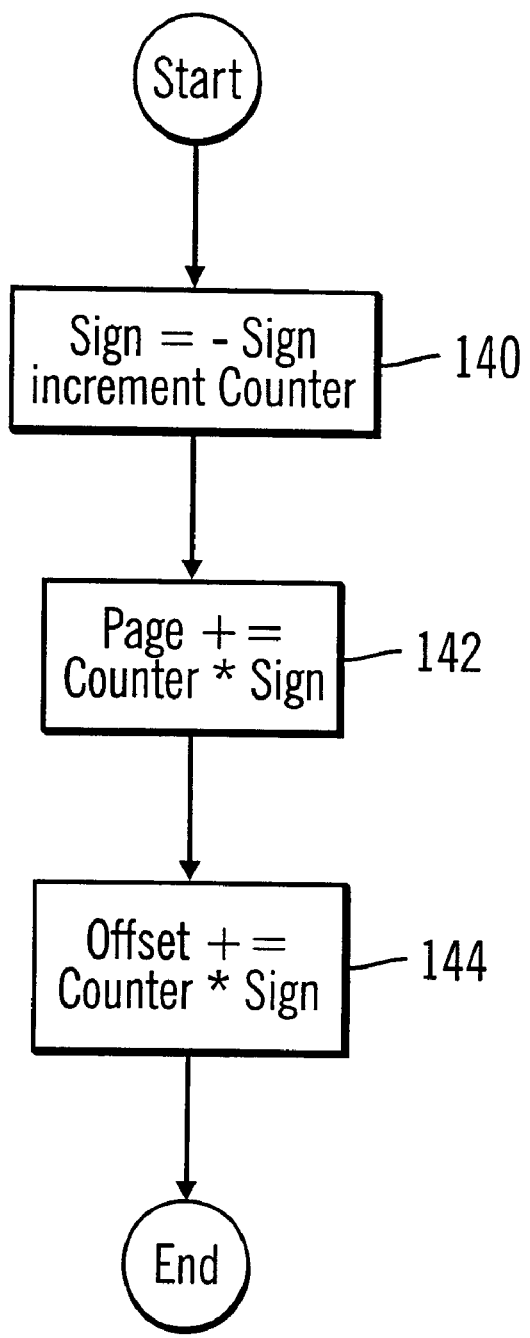

In step 102 of the flow chart of FIG. 6, the record insertion method moves to the next page in a spiral manner, by resetting the variables according to the method shown in the flow chart of FIG. 8. Specifically, Sign is set equal to 1, Counter is set equal to 9, Page is set equal to 8, and Offset is set equal to 8. Query 104 then returns the answer "Yes" as Sign is greater than 0 and the record insertion method proceeds to step 106. In step 106, the variable numPages is set equal to lastPg minus Page plus 1. As the number of pages is 10, and lastPg equals 9, numPage is set equal to 2 (9−8+1). This indicates that two pages are left, and the method knows that it is moving to the right boundary. If, in contrast, query 104 had returned the answer "No", then in step 108, numPages would have been set equal to Page plus 1, which would have indicated the number of pages to go to the left boundary. In step 110, Counter is set equal to 0, and the record insertion method proceeds to C' at the top of FIG. 7.

Query 120 of the flow chart of FIG. 7 returns the answer "Yes" as the counter is equal to 0 and numPages is equal to 2. The method then proceeds to query 124, which returns the answer "No", as, from the diagram of FIG. 15, it can be seen that the target free space map indicates that there are no free space bytes available at Page offset 8. In step 132, Counter is incremented to 1 and query 134 returns the answer "Yes" as Sign equals 1 and is thus greater than 0. In step 136, Page and Offset are incremented to 9, and the method then proceeds back to point $C_1$ at the top of the flow chart of FIG. 7.

On the second run through, query 120 returns the answer "Yes", as Counter is now equal to 1, which is still less than 2. As shown in the diagram of FIG. 15, page offset 9 has 12 free space bytes available. This is enough to accommodate the new record to be inserted. Thus, query 124 returns the answer "Yes". In step 126, the last page fixed is unfixed, and the page corresponding to page offset 9 is fixed. If the page corresponding to page offset 9 actually has sufficient space to accommodate the new record to be inserted, then query 128 returns the answer "Yes" and the new record is inserted on page 9 in step 130 before the record insertion method ends.

Assume, for illustrative purposes, that there is insufficient space on the page corresponding to page offset 9 to accommodate the new record to be inserted. Then, in step 132, the counter will be increased from 1 to 2, and after query 134 returns the answer "Yes", Page and Offset will be incremented to 10. The record insertion method will then proceed to point $C_1$ at the top of the flow chart of FIG. 7.

This time through, query 120 returns the answer "No" as the counter 2 is no longer less than the numPages variables, which was also 2. The method then proceeds to step 122, which returns the answer "No Space Found", before this stage of the record insertion method ends.

Referring to FIG. 18, the various steps and queries of the flowcharts of FIGS. 4 to 7 are represented in pseudo code. Referring to FIG. 19, the various steps and queries of the flowchart of FIG. 8 are represented in pseudo code.

At that point, in the example where there is insufficient space on the page corresponding to page offset 9 to accommodate the new record, the first stage of the record insertion method will have ended unsuccessfully. In other words, once it is determined that there is not enough space on the target page for the record to be inserted there, an effort is made to insert the record on a page which is reasonably close to the target page. However, at some point the effort to insert the record on a page close to the target page is abandoned, and instead, a more efficient free space searching method is used to search through the rest of the FSMPs for space in which to insert the record. In the foregoing case, the number of pages surrounding the target page that are searched before the effort to insert the new record on a page close to the target page is abandoned, is simply the number of pages on the same FSMP as the target page. This, however, is not essential; a different number of pages surrounding the target page can be searched if desired.

If the table is very large, however, then it will be inefficient to search through the free space map for the entire table, as this may be very time consuming and significantly degrade performance of the database management system, particularly if the table is full and a full search is done for every insert, after which, the record is appended anyway. Accordingly, the record insertion method searches a certain number of pages, but then gives up after that number and merely appends the new record to the end of the table. Further, each time the method starts searching beyond the target FSMP, it starts to search where it left off the last time, so that over time, the entire table is searched. Accordingly, the last page checked is cached before the record is appended to the end of the table, in order to enable the search to be carried on from where it left off.

At this stage, the method according to the present invention allows the user to limit the number of FSMPs that are searched for each row inserted and to define some amount of space (e.g. a predefined number of pages) for appending data before a search is done again. If the configured number of space map pages have been searched without finding a page for the row, the row will be appended to the table. The predefined number of new pages will be filled before another search is done. Subsequent searches start from where the previous search ended whether or not a page with free space was found. The search continues in a circular fashion; that is, once the end of the free space map is reached, the search resumes at the beginning of the free space map. If consecutive searches fail, for each failed search, the predefined number of pages to fill before searching again is increased. The user can configure the maximum value for the predefined number of pages for appending data before searching will resume.

FIGS. 9 and 10 illustrate a third stage of the record insertion method according to a preferred aspect of the present invention. In this stage, a target page has been determined, and it has also been determined that none of the pages on the FSMP for the target page have enough space to store the new record to be inserted. As shown in FIG. 9(*i*), in the third stage or submethod 200 of the record insertion method, the search for sufficient free space to accommodate the new record moves beyond the FSMP for the target page. The submethod 200 is executed by a process or thread for inserting data into a page in a table in the database. As will now be described, the submethod 200 searches the free space map for the table to find a page on which there is sufficient free space to insert the data, i.e. a row or tuple.

As shown in FIG. 9(*i*), the first step of the third stage comprises a query 202 which checks two flags, SEARCH and FREE_SPACE. The flags SEARCH and FREE_SPACE, and other flags and variables, described below comprise global cached variables with initial values which are updated by the process or thread that inserts the data while the variables FSMPS_SEARCHED, FIRST_PAGE_SEARCHED and SEARCH_ENTIRE_TABLE are local variables which are maintained by the process/thread that inserts the data. The SEARCH flag indicates whether the free space map is to be searched, and the FREE_SPACE flag indicates whether there is free space available in the table. If the SEARCH flag is FALSE, indicating that a search of the free space map is not to be made, or if the FREE_SPACE flag is FALSE, indicating that there is no free space available in the table, then processing moves to query 203 in FIG. 9(*iv*). As will be described in further detail below, the FREE_SPACE flag and the SEARCH flag will be FALSE if the table is put into a "Table Full State". The SEARCH flag is also set to FALSE when a search for free space fails to find space as will also be described in further detail below.

On the other hand, if the table is not full and a search is to be done, then a variable FSMPS_SEARCHED is reset in step 204. Also in step 204, a variable FIRST_PAGE_SEARCHED is set to the CURRENT_PAGE indexed in the table. The FSMPS_SEARCHED variable indicates the number of space map pages (FSMP's) which have been searched in the free space map, and the variable FIRST_PAGE_SEARCHED indicates the first page in the table which will be checked for free space to insert this row of data. Referring still to step 204 in FIG. 9(*i*), a variable CURRENT_FSMP is set to the space map page containing the entry for the page indicated by the variable CURRENT_PAGE. Lastly in step 204, a flag SEARCH_ENTIRE_TABLE is set to FALSE. The SEARCH_ENTIRE_TABLE flag indicates whether the entire table is to be searched.

Next in query 206, the space map page indicated by the variable CURRENT_FSMP is checked to determine if the current space map page indicates that the current page in the table (i.e. CURRENT_PAGE) has sufficient free space for the row to be inserted. If the space map page indicates sufficient free space, then an actual check of the current page is made in query 208 to determine if the free space indicated in the space map page is useable. If sufficient useable free space is found in the current page of the table, then the flag SEARCH is set to TRUE in step 210, and another flag SPACE_FOUND is also set to TRUE. The SPACE_FOUND flag indicates that sufficient free space was found to insert the data, while the SEARCH flag is set to indicate that a successful search was conducted. In step 210, a variable SEARCH_START_PAGE is set to the current page (i.e. CURRENT_PAGE), and variables TIMES_TABLE_SEARCHED, AMOUNT_TO_APPEND and AMOUNT_APPENDED are also set to ZERO. The variable SEARCH_START_PAGE is set to the current page so that subsequent insert operations know on which page space was last found. It will be understood the SEARCH_START_PAGE variable is a global variable which indicates the page number of the first page searched since space was last found by any insert operation, and the FIRST_PAGE_SEARCHED variable is a local variable which indicates the page number of the first page searched for the current insert. The TIMES_TABLE_SEARCHED variable indicates the number of times the entire free space map for the table has been searched without finding free space. As will be described in further detail below, preferably no more than two searches of the entire free space map are allowed before the table is put into a Table Full State. For a table with fixed length columns only, the table is placed in the Table Full State after the entire free space map has been searched once without finding free space. In this case, free space was found so the TIMES_TABLE_SEARCHED variable is set to ZERO. The AMOUNT_TO_APPEND variable provides a running total of the amount of space to append before the free space map is to be searched again. If consecutive searches of the free space map fail to find free space, for each failed search, the amount of space is increased by some increment to a maximum value as described in further detail below in FIG. 9(v). The maximum amount of space to be appended before searching is resumed can be configured by the user. The AMOUNT_APPENDED variable indicates the amount of space which has been appended since the start of the appending operation.

It will be appreciated that maintaining a Table Full State eliminates the search overhead when it is known that there is no free space available in the table. Furthermore, allowing the user to configure the amount of space to be freed before resetting the Table Full State provides additional control in trading off insert performance versus space reuse as will be described in more detail below.

Having found free space in the current page, the data is inserted into the page in step 212. The searching and row insertion procedure is done and processing then returns to the calling thread or process in step 214.

If the entry in the space map page indicates that space is not available on the current page (query 206), then the CURRENT_PAGE variable is incremented in step 216 in order to search for free space on the next page in the table. In query 218, a check is made to determine if the new current page is past the last page in the table, by comparing the CURRENT_PAGE variable to a variable LAST_PAGE. The LAST_PAGE variable holds the page number of the last page in the table. If the page number in CURRENT_PAGE does not exceed the LAST_PAGE number, then a check is made to determine if the current page is on the next space map page (query 220). If the current page is located on the next space map page, then the CURRENT_FSMP variable is advanced to the next space map page in step 222. Referring back to query 218, if the CURRENT_PAGE number exceeds the LAST_PAGE number, then the search is set to commence back at the beginning of the free space map and the start of the table. The CURRENT_FSMP variable is set to ZERO and the CURRENT_PAGE variable is also set to ZERO (step 224).

Next in query 226 (FIG. 9(ii)), a check is made to determine if more than 50% of the entries in the previous space map page have been searched. If more than 50% of the entries have been searched, then the space map page is included in the number of space map pages searched and the FSMPS_SEARCHED variable is incremented (step 228). Once the value for the FSMPS_SEARCHED variable reaches the maximum value defined by the SEARCH_LIMIT variable, further searching of the space map pages stops and the row is appended to the end of the table. If less than 50% of the entries in the space map page have been searched, then the FSMPS_SEARCHED variable is not incremented.

Referring still to FIG. 9(ii), a check is made in query 230 to determine if the SEARCH_START_PAGE is the same as the CURRENT_PAGE. If TRUE, this means that the search has wrapped around and the free map space for the entire table has been searched without finding space. A further check is made of flag SEARCH_ENTIRE_TABLE in query 232. The SEARCH_ENTIRE_TABLE flag indicates whether the entire table is to be searched for the current insert. If the SEARCH_ENTIRE_TABLE flag is FALSE, then the entire table is not to be searched and a variable TIMES_TABLE_SEARCHED is incremented in step 233 (FIG. 9(iii)) as will be described in more detail below. The TIMES_TABLE_SEARCHED variable indicates the number of the times the table has been searched without finding free space to insert one or more rows of data. On the other hand, if the SEARCH_ENTIRE_TABLE flag is set to TRUE, then the entire table has to be searched for the current insert, and a check is made at query 234 to determine if the FIRST_PAGE_SEARCHED is the same as the CURRENT_PAGE. If TRUE, then the entire table has been searched for the current insert and a further check is made at query 235 in FIG. 9(v) as will be described in more detail below.

Referring again to FIG. 9(ii), if the FIRST_PAGE_SEARCHED is not the same as the CURRENT_PAGE, then a check of the SEARCH_ENTIRE_TABLE flag is made in query 236. If TRUE, then the entire table is to be searched, and a check is made in query 206 (FIG. 9(i)) to determine if the current space map page indicates free space on the current page. If the SEARCH_ENTIRE_TABLE flag is FALSE, i.e. the entire table is not to be searched, then a check is made in query 238 to determine if the number of space map pages searched is equal to the maximum number of space map pages specified in the variable SEARCH_LIMIT. If the maximum number of space map pages have not been searched, then searching continues and the CURRENT_FSMP is checked for free space in query 206 (FIG. 9(i)) as described above. On the other hand, if the SEARCH_LIMIT for FSMPS_SEARCHED has been reached then a check is made of flag SPACE_FOUND in query 239 in FIG. 9(v) as will be described in more detail below.

Reference is next made to FIG. 9(iv). If the SEARCH flag is FALSE and the FREE_SPACE flag is FALSE (query 202 in FIG. 9(i)), then there is no free space in the table and further searching is not to be done. As will now be explained, the submethod 200 appends the row to the table by first attempting to insert the row of new data on the last page in the table or adding a new page to the table if there is no space available on the last page. As shown in FIG. 9(*iv*), a check is made in query 203 to determine if there is space available on the last page. If yes, then the data is inserted on the last page in the table (step 240) and processing returns to the calling process/thread (step 242).

If there is not enough space available on the LAST_PAGE (query 203), then a further check is made in query 244 of the FREE_SPACE flag. The FREE_SPACE flag indicates whether there is free space available in the table. If there is no free space available, i.e. the FREE_SPACE flag is FALSE, then a check is made in query 246 to determine if the storage media (e.g. DASD or hard disk) is full. If the storage media is full, then an error has occurred (step 248) and processing returns to the calling process/thread (step 250). On the other hand, if there is still space available in the storage media, a new page for the table is created (step 252) and this becomes the new last page in the table and the LAST_PAGE variable is incremented by one (step 252). The row of data is inserted on the new page (step 254) and processing returns to the calling process/thread (step 256).

Referring to FIG. 9(*iv*), if there is free space available in the object (query 244), then a check is made in query 258 to determine if the variable AMOUNT_APPENDED is greater than or equal to the variable AMOUNT_TO_APPEND. The AMOUNT_APPENDED variable indicates the amount of space appended since the start of appending data to the table. The AMOUNT_TO_APPEND variable provides the total amount of space to append before another search is made for space in the table. The AMOUNT_TO_APPEND variable is incremented by a value m each time consecutive searches fail to find space, subject to a maximum amount specified by max_amount, where max_amount is either specified by the user or a default value from the system. If the AMOUNT_APPENDED is less than the AMOUNT_TO_APPEND, then a check is made to determine if the storage media is full (step 260). If the storage media is not FULL, then there is space to create a new page which is appended to the end of the table. In step 262, a new page is created and the LAST_PAGE variable is incremented by ONE. The AMOUNT_APPENDED variable is also increased by the size of the page appended (PAGE SIZE). After the new page is created, the row of data is inserted on the new page (step 264) and processing returns to the calling process/thread (step 266).

Referring still to FIG. 9(*iv*), if the AMOUNT_APPENDED is less than the AMOUNT_TO_APPEND (query 258) but the storage media is full (query 260), then any free space must be found by searching the free space map. A search of the space map pages in the free space map is commenced starting at the current page in the table. As shown in step 268, the SEARCH_ENTIRE_TABLE flag is set TRUE, the variable FSMPS_SEARCHED is set to ZERO, the variable FIRST_PAGE_SEARCHED is set to the current page in the table (i.e. variable CURRENT_PAGE) and the variable CURRENT_FSMP is set to the space map page with an entry for the current page in the table. Searching resumes with a check in query 206 (FIG. 9(*i*)) to determine if the current space map page indicates free space on the current page.

Referring still to FIG. 9(*iv*), if the AMOUNT_APPENDED is greater than or equal to the AMOUNT_TO_APPEND, then the limit for appending pages has been reached and any free space must be located by searching the free space map. The search is resumed by first performing the following operations in step 270: setting the SEARCH flag to TRUE, clearing the TIMES_TABLE_SEARCHED variable and the AMOUNT_APPENDED variable, setting the SEARCH_ENTIRE_TABLE flag to FALSE, setting the FIRST_PAGE_SEARCHED variable to the current page in the table (i.e. variable CURRENT_PAGE), and setting the variable CURRENT_FSMP to the space map page with an entry for the current page in the table. Searching then resumes with a check in query 206 (FIG. 9(*i*)) to determine if the current space map page indicates free space on the current page.

It will be appreciated that the first page in a search that did not find space is cached if the previous search found space. The cached page is initialized to the first page in the table before any search is performed. This cached page is used to determine when the entire free space map has been searched. While the table is in a Table Full State, a search is not done. Instead, all rows will be appended to the table (blocks 252–254 in FIG. 9(*iv*)). The table full state is reset when some amount of space is freed from the table by, deletion of rows or by updates to rows which cause the rows to shrink in size as will be described below with reference to FIG. 10.

As described above with reference to FIG. 9(*ii*), if the flag SEARCH_ENTIRE_TABLE is FALSE, i.e. the entire table is not to be searched, then the variable TIMES_TABLE_SEARCHED is incremented in step 233 (FIG. 9(*iii*)). Referring to FIG. 9(*iii*), after the TIMES_TABLE_SEARCHED variable is incremented, a check is made in query 272 to determine if the data for the table comprises fixed length columns only. If the data is not fixed length, a check is made in query 274 to determine if the table (i.e. the free space map) has been searched two times. For tables with, variable length columns, the entire map will be searched twice for an exhaustive search. If no free space is found after an exhaustive search of the space map pages in the free space map, the table is put in a "Table Full State". If the table has only been searched once, then the search resumes by first checking query 206 as described above with reference to FIG. 9(*i*). If the table has been searched twice without finding space, then the table is placed in the "Table Full State" as indicated in step 276. The FREE_SPACE flag is set to FALSE, the SPACE_FREED variable is set to ZERO (i.e. amount of space freed since the FREE_SPACE flag was set to FALSE), and the variable FIRST_PAGE_WITH_SPACE is set to NEGATIVE ONE. The variable FIRST_PAGE_WITH_SPACE indicates the page closest to the start of the table with free space, and is set to the smallest page number (i.e. closest to the beginning) in the table from which space was freed after the flag FREE_SPACE is set to FALSE. In the case of a table with fixed length columns only (i.e. decision bock 272 is TRUE), the table is placed in the Table Full State in step 276 after the entire free space map has been searched once for an exhaustive search. Next in query 278, a check is made to determine if the storage media for the table (e.g. disk drive memory or DASD) is full. If the media is full, an error is registered (step 280) and further searching is terminated and control returns to the calling process/thread (step 282). On the other hand, if there is still space in the storage media (i.e. query 278 is FALSE), then a new page is created and appended to the table (step 284) and the last page number in the table (i.e. variable LAST_PAGE) is incremented by ONE, and the row of data is inserted on this new page appended to the table (step 286), and control returns to the calling process/thread (step 282).

It will be appreciated that the reason for searching the free space map twice for tables with variable length columns is that later rows being inserted could be smaller than earlier rows. While there may not have been enough space for the larger rows, the smaller rows may fit in the free space available in the table. The exhaustive search will be done over a number of inserts where each search does not find free space unless the free space map contains a smaller number of pages than the value configured for the maximum number of FSMPs to search.

Figure 9V:
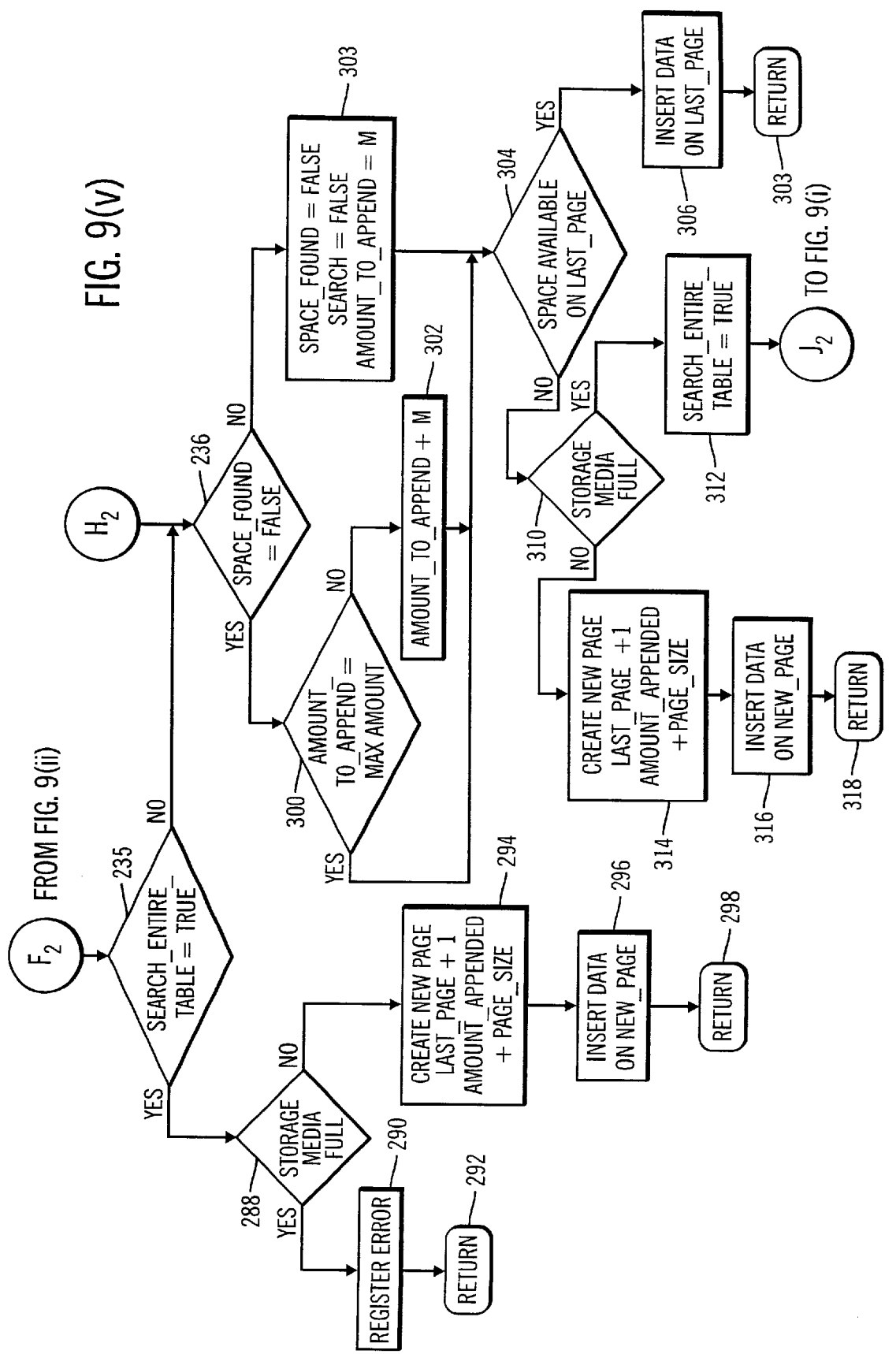

Referring back to FIG. 9(ii), if the first page checked for space for the current row insert request (i.e. variable FIRST_PAGE_SEARCHED) is the same as the current page to be searched for space (query 234 in FIG. 9(ii)), then a check is made to determine if the entire table is to be searched (i.e. the SEARCH_ENTIRE_TABLE flag) in query 235 in FIG. 9(v). If the entire table is to be searched, then a check is made to determine if the storage media is full in query 288. If the storage media is full, then an error is registered (step 290) and the searching process and control returns to the calling process/thread(step 292). On the other hand, if there is still space in the storage media, the following operations are performed in step 294: a new page is appended to the table, the LAST_PAGE variable is incremented by ONE to indicate the new last page in the table, and the AMOUNT_APPENDED variable is increased by the page size of the new page. Next the row of data is inserted on the new page (step 296) and the searching procedure is completed and control returns to the calling process/thread (step 298).

If the maximum number of space map pages have been searched, i.e. FSMPS_SEARCHED equals SEARCH_LIMIT (query 238 in FIG. 9(ii)), then the SPACE_FOUND flag is checked in query 239 in FIG. 9(v). The SPACE_FOUND flag indicates whether any free space was found during the previous search of the space map pages in the free space map. If no free space was found, i.e. SPACE_FOUND flag is FALSE, then a check is made in query 300 to determine if the running total of the amount of space appended (i.e. AMOUNT_TO_APPEND) exceeds the maximum amount of space which can be appended. If the maximum amount has not been reached, the variable AMOUNT_TO_APPEND is incremented by a value m in step 302. The variable AMOUNT_TO_APPEND is incremented by m subject to the maximum MAX_AMOUNT each time consecutive searches fail to find space. The variable MAX_AMOUNT contains a value x which is a multiple of m and is either set by the user or takes a default value from the DBMS or RDBMS. If the maximum amount of space is already to be appended, then step 302 is bypassed. On the other hand, if space was found for the previous search (i.e. SPACE_FOUND is TRUE), then the SPACE_FOUND flag is set to FALSE, the SEARCH flag is set to FALSE because space was not found and the rows will be appended to the table, and the variable AMOUNT_TO_APPEND is set to the value m in step 303.

Referring still to FIG. 9(v), next a check is made in query 304 to determine if there is sufficient space available on the LAST_PAGE in the table for the row. If there is space on the last page in the table, the row of data is inserted (step 306) and the searching and row insertion process is completed and control returns to the calling process/thread (step 308). If there is no space available on the last page, then a check is made in query 310 to determine if the storage media is full. If TRUE, then additional disk space cannot be allocated to store the row, and an exhaustive search of the entire free space map will be done before an error is returned. Accordingly in step 312, the flag SEARCH_ENTIRE_TABLE is set to TRUE to indicate that the entire table (i.e. free space map for the table) is to be searched, and searching resumes on the current FSMP (query 206 in FIG. 9(i)). If there is still space in the storage media (query 310), then the following operations are performed in step 314: a new page is appended to the table, the LAST_PAGE variable is incremented by ONE to indicate the new last page in the table, and the AMOUNT_APPENDED variable is increased by the page size of the new page. Next the row of data is inserted on the new page (step 316) and the free space searching and row insertion procedure is completed and control returns to the calling process/thread (step 318).

As described above, the table is put into a Table Full State if no free space is found after an exhaustive search of the free space map. While in the Table Full State no searching is done and all new rows of data are appended to the table. The Table Full State is reset when some amount of space is freed as a result of rows being deleted from the table or updates being made to rows which cause the rows to shrink in size as will now be described with reference to FIG. 10.

Reference is made to FIG. 10 which shows a method, indicated generally by reference 322, for accounting for space freed in the table. The method 322 is invoked in response to a command to delete a row of data or a command to update a row of data which results in the freeing of some space in the table (step 324). After execution of the delete or update command by the process/thread (step 326), the FREE_SPACE flag is checked in query 328 to determine if there is any available free space in the table. If there is still available free space, independent of the deletion or update, control is returned to the calling process/thread (step 329).

If the FREE_SPACE flag was set to FALSE, i.e. indicating that there is no available free space in the table, then the amount of space freed through the previous delete or update operation is added to the variable SPACE_FREED (step 330). The SPACE_FREED value represents the amount of space freed since the FREE_SPACE flag was set to FALSE. Next in query 332, a check is made to determine if the variable FIRST_PAGE_WITH_SPACE is set to NEGATIVE ONE. As described above, the FIRST_PAGE_WITH_SPACE variable is set to negative one when a Table Full State is reached (step 276 in FIG. 9(iii)) and indicates that there are no pages in the table with free space. If FIRST_PAGE_WITH_SPACE contains a page number, that page is compared with the page from which the space was freed (query 334). If there is no page with free space (i.e. FIRST_PAGE_WITH_SPACE=−1) or the page from which space was freed is earlier in the table compared to the page number stored in the variable FIRST_PAGE_WITH_SPACE, then the variable FIRST_PAGE_WITH_SPACE is set to this page (step 336). Next, a check is made in query 338 to determine if the SPACE_FREED since the FREE_SPACE flag was set to FALSE is equal to or exceeds the amount specified in variable SPACE_TO_FREE. The SPACE_TO_FREE variable specifies the amount of space y that needs to be freed before the FREE_SPACE flag can be reset and searching of the free space map resumed. The value y is either set by the user or as a default value by the DBMS or RDBMS. If the amount of space freed is greater than or equal to the value in SPACE_TO_FREE, then the Table Full State is reset and searching is enabled in step 340 as follows: the FREE_SPACE flag is set to TRUE indicating that free space is available in the object, the SEARCH flag is set to TRUE indicating that a search for free space can be made, the SPACE_FOUND flag is set to TRUE, the CURRENT_PAGE variable is set to the FIRST_PAGE_WITH_SPACE, the SEARCH_START_PAGE is set to the CURRENT_PAGE, and the variable TIMES_TABLE_SEARCHED is set to ZERO, and control returns (step 329).

It will be appreciated that the method according to the present invention limits the number of FSMPs which are searched in response to a request to insert a row of data. The insertion of a new row does not incur the cost of searching the entire free space map. Since rows are appended until the predefined number of pages are filled, there will be some delay before the next search is performed. When consecutive searches fail to find space, i.e., it appears unlikely that a page with sufficient free space will be found, the predefined number of pages to append before a search is done again is incremented for each failed search until the maximum configured amount is reached. This allows more activity on the table that could potentially free up space, thereby increasing the probability that a future search will find space. The overhead of searching for free space is reduced for most rows inserted when it appears unlikely that free space will be found (although the target FSMP will still be searched for each row being inserted). Since searching will resume once the number of pages to be appended have been filled, free space will eventually be reused. Furthermore allowing the user to configure both the number of FSMPs to search and the maximum number of pages to append before searching resumes provides the user with a mechanism to trade-off row insertion performance with space reuse. In the case where row insertion performance is more important than space reuse, the user would configure the search distance to be small and the number of pages to append to be large. In the case where space reuse is more important, the user would configure the number of pages to append to be small and the search distance to be large.

As described above, the record insertion method searches a specified number of FSMPs starting from the FSMP that contains the cached page in its third stage. The cached page is updated when a search is ended either by finding a page to contain the record, or after searching the specified number of SFMPs. The free space map is searched linearly from the cached page to the end of the free space map; however, the target FSMP is omitted from this search as this FSMP was previously searched. In the above-described version, the first page found that contains enough space for the record can be used. After the specified number FSMPs has been searched, the page in the FSMP that contains the most space is selected, so that the record being inserted is less likely to fill up all of the space on this page—this is called worst fit selection. If the record being inserted fills up all of the spaces on a page, then the record is much more likely to impede further clustering on that page, particularly when that page is the target page for a subsequent insert.

Referring to FIGS. 11 to 14, flow charts illustrate the fourth stage of the record insertion method according to a preferred aspect of the invention in which a worst fit selection is made from among the pages having enough space to accommodate the new record being inserted. Referring to FIG. 16, there is illustrated a diagram representing a FSMP that is not the target FSMP. The worst fit selection in the below example is made from among pages represented by this FSMP. The flowcharts of FIGS. 11 to 14 are described below with reference to an example based on the FSMP of FIG. 16.

Figure 11:
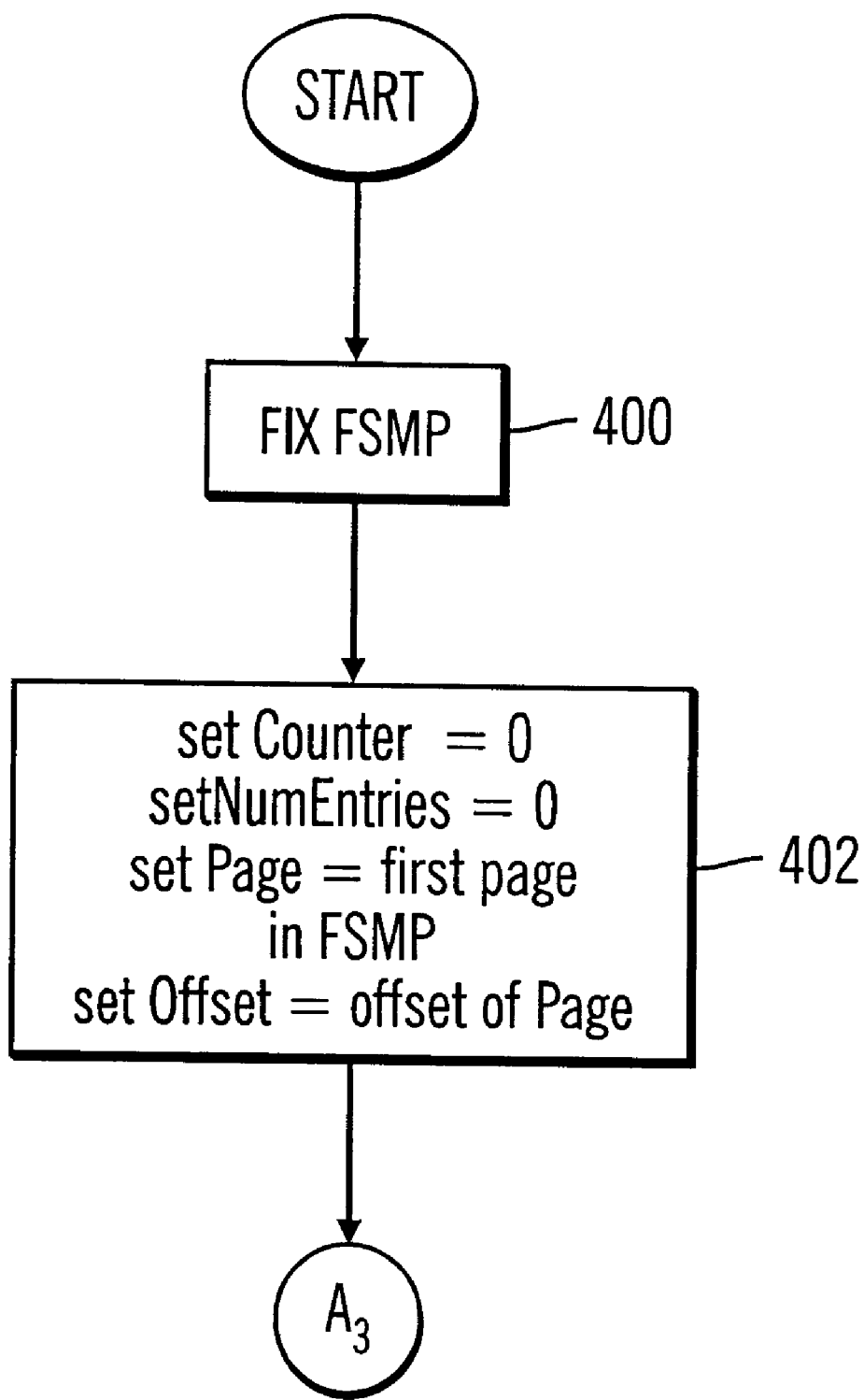
FIGS. 11 to 14 show flow charts illustrating a sequence of steps of a worst fit selection method in accordance with an aspect of the invention.

In step 400 of the flow chart of the FIG. 11, the free space map page of FIG. 16 is fixed. Then, in step 402, the following variables are set as follows: Counter is set equal to 0; numEntries is set equal to 0; Page is set equal to 10, which is the first page offset in the FSMP; and Offset is set equal to the first offset, which is 0.

Figure 12:
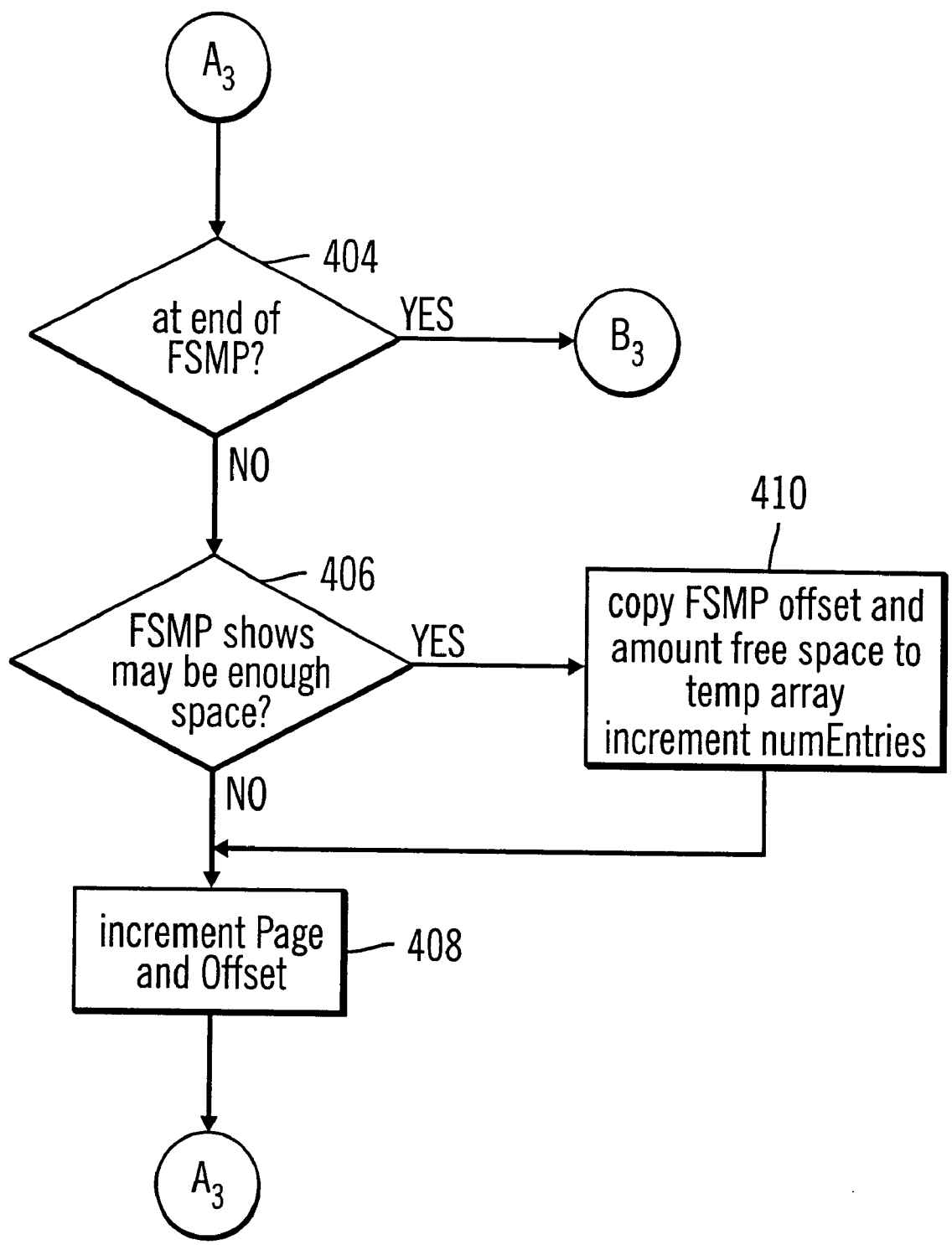

In the flow chart of FIG. 12, query 404 returns the answer "No" as the method is not yet at the end of the next FSMP. Then query 406 returns the answer "No", as Page offset 10 has no free space according to the FSMP diagram of FIG. 16. In step 408, Page and Offset are incremented to 11 and 5 respectively, and the method then returns to point $A_3$ at the top of the flow chart of FIG. 12.

On the second run through of the flow chart of FIG. 12, query 404 again returns the answer "No". However, assuming that the record requires 5 bytes of free space, query 406 will return the answer "Yes", as 5 bytes of free space are available for this page. The method then proceeds to step 410, in which the FSMP offset and the amount of free space are copied to a temporary array. Then, the method returns to step 408, in which Page and Offset are incremented to 12 and 2 respectively before the method returns to point $A_3$ at the top of the flow chart of FIG. 12.

Running through the flow chart of FIG. 12 for pages 12 to 18, query 406 returns the answer "Yes" in the case of pages 14 and 17, and the FSMP Offsets and amount of free space for both of these pages are then recorded to the temporary array in step 410. On the final run through the flow chart of FIG. 12 where Page and Offset are set equal to 19 and 9 respectively, query 404 returns the answer "Yes" as the method is now at the end of the FSMP, and the method proceeds to point $B_3$ at the top of the flow chart of FIG. 13.

Figure 13:
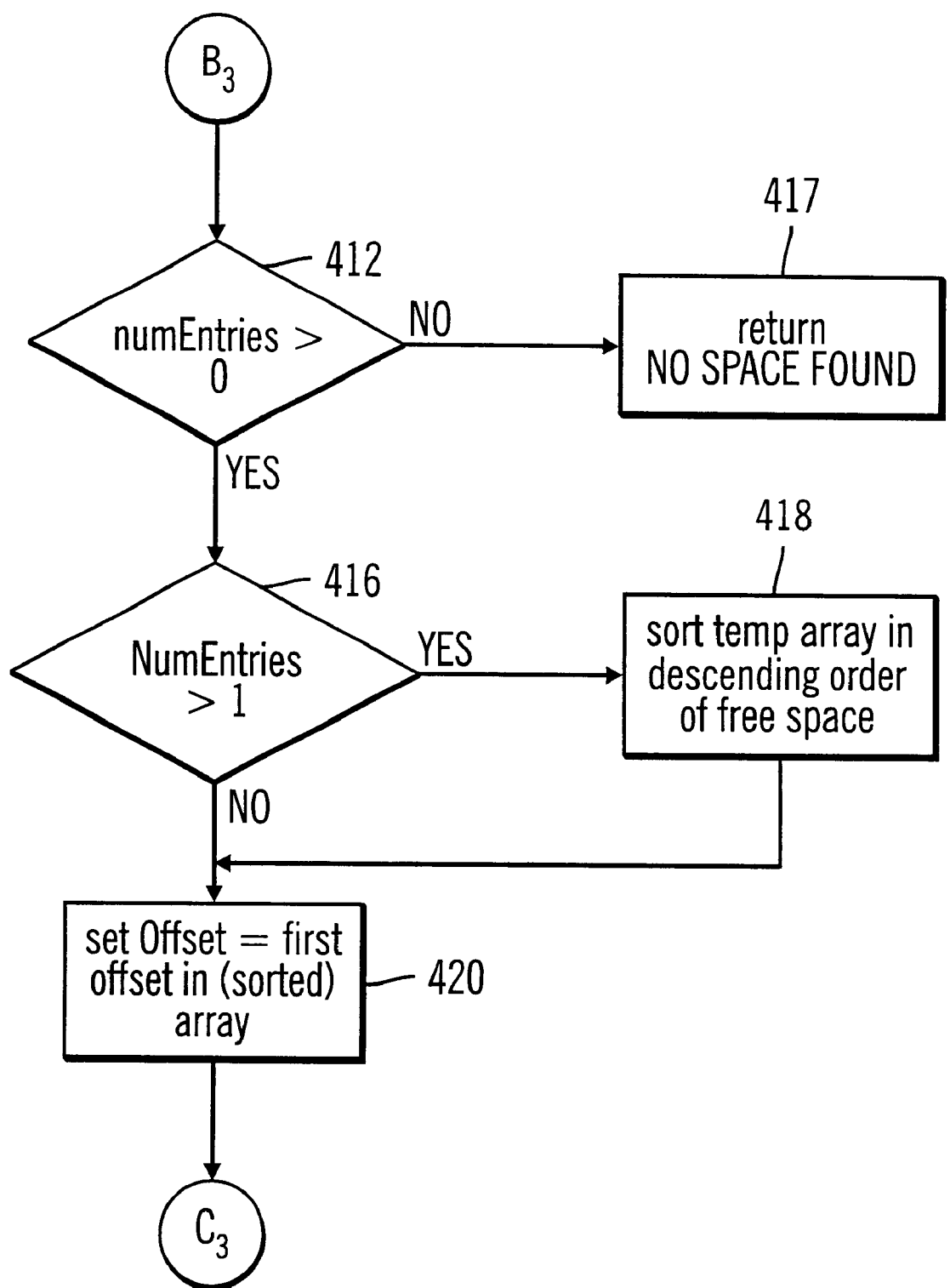

In step 412 of the flow chart of FIG. 13, query 412 returns the answer "Yes" as numEntries is greater than 0. NumEntries is equal to 3, as this is the number of entries that have been saved in the temporary array. After query 412 returns the answer "Yes", query 416 returns the answer "Yes", as the number of entries exceeds 1, and method proceeds to step 418 in which the temporary array is sorted in descending order in terms of free space. Accordingly, the offset and free space pairs are ordered <4,7> <7,6> <1,5>, corresponding to pages 14, 17, and 11 respectively. Then, in step 420 the offset is set equal to the first offset in the sorted array, this offset is offset 4which corresponds to page 14. The method then proceeds to point $C_3$ at the top of the flow chart of FIG. 14.

If the number of bytes required for the record being inserted had been 8 instead of 5, than no pages having sufficient free space would have been found and stored in the temporary array, and numEntries would have remained equal to 0. Accordingly, when the method reached the flowchart of FIG. 13, query 412 would have returned the answer "No" and in step 414 the message "NO_SPACE_FOUND" would have been returned, reflecting the fact that none of the pages represented by the FSMP had sufficient free space to accommodate the new record.

If, on the other hand, the number of bytes required for the record being inserted had been 7, then only one page, page 14, would have had enough free space to store the record. The offset and free space available for this page would have been stored in the temporary array (<4,7>), and numEntries would have been set equal to 1. Query 412 would then have returned the answer "Yes", but query 416 would subsequently have returned the answer "No" and the method would have proceeded directly to step 420, bypassing step 418.

Figure 14:
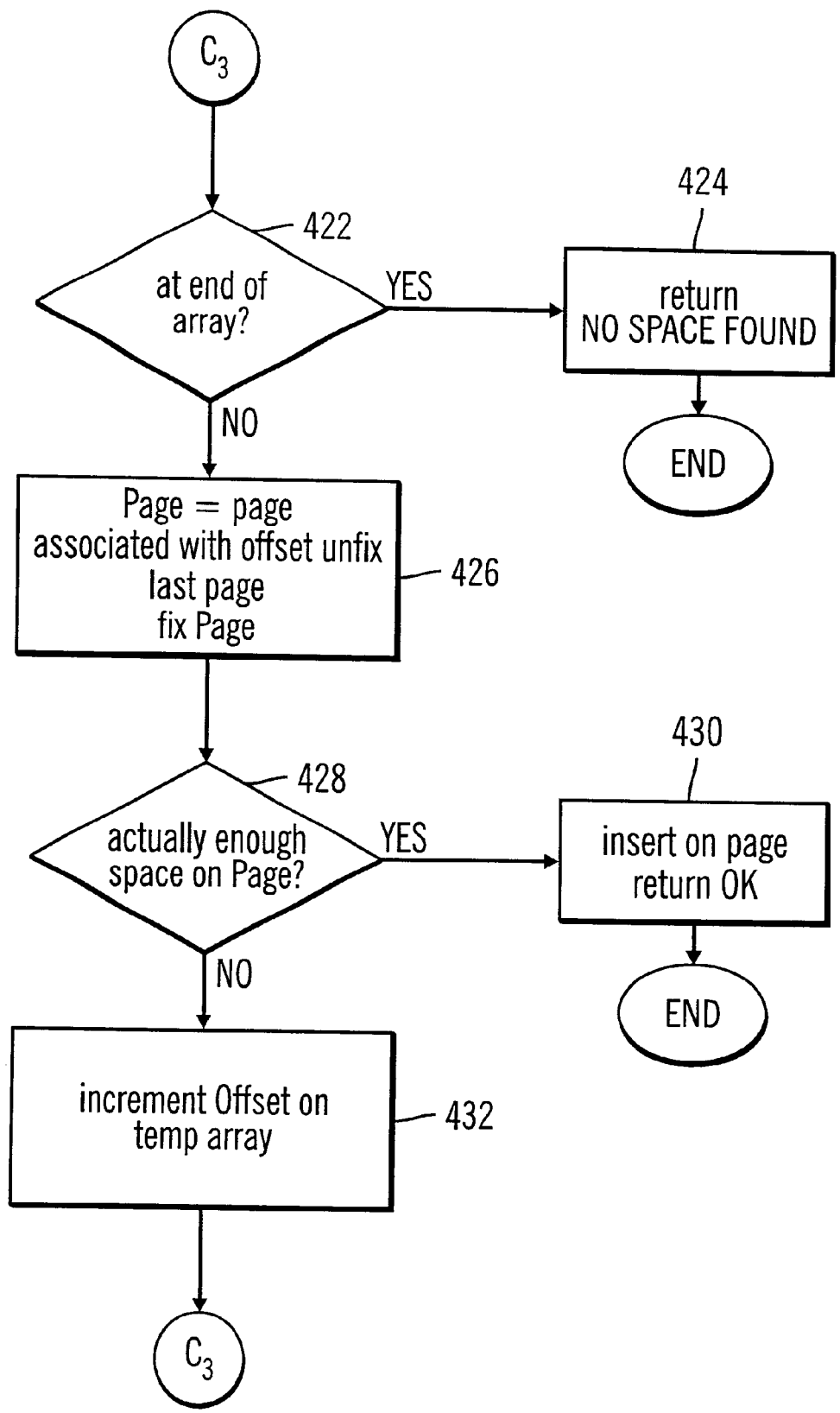

Returning to the example in which a new record requiring 5 bytes is to be inserted and the temporary array containing the three pairs <4,7> <7,6> <1,5> has been generated and ordered in descending order, the method continues from point $C_3$ at the top of the flowchart of FIG. 14. Query 422 of the flow chart of FIG. 14 returns the answer "No" as the method is not yet at the end of the array; instead, as indicated in step 420, the method is at the beginning of the array. In step 426, Page is set equal to the page associated with the offset—the page associated with offset 4 is page 14. The last page is unfixed, and page 14 is fixed. Query 428 checks if there is actually enough space on this page. If there is, then query 428 returns the answer "Yes" and the record is inserted on page 14 on step 430, after which the method ends as the record has been inserted. If query 428 returns the answer "NO", then the offset is incremented in 432 to go to the next <offset, free space> pair in the temporary array.

The method will then run through the flow chart of FIG. 14 once or twice more. If, neither page 17 nor page 11 actually has enough space to accommodate the new record, then the method will proceed to point $C_3$ at the top of the flow chart of FIG. 14 for a fourth time. On this run through the flow chart, however, query 422 will return the answer "Yes" as the method will be at the end of the temporary array, and then step 424 will return the message NO_SPACE_FOUND before the method ends. If none of these pages has enough space, then the method moves to the next FSMP and repeats the process until at least one page is found having sufficient space to accommodate the new record, or the specified number of FSMPs has been checked.

Referring to FIG. 20, the various steps and queries of the flowcharts of FIGS. 11 to 14 are represented in pseudo code.

The foregoing description has described a preferred implementation of the invention in which an FSMP is used to move quickly and efficiently in order to determine what pages to check for space. However, the invention does not require that an FSMP be used. Nor does the invention require a particular search algorithm to be used for regular inserts. Instead, the invention may be implemented using any method that initially conducts a search for a certain number of pages around the target page in a spiral fashion in the hope of inserting the record relatively close to the target page. If free space for inserting the record is not found in this initial stage of the search, then the rest of the table should be searched as efficiently as possible using a worst fit algorithm of the sort described above in order to prevent negatively impacting on other subsequent clustering possibilities.

The present invention may be embodied in other specific forms without departing from the spirit or essential characteristics thereof. Certain adaptations and modifications .of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method for searching a table for free space for inserting a new record into the table in a database management system, wherein the table resides in a storage media, and wherein a series of table pages store a plurality of records, and has a clustering index defined on a column of the table, the new record having a new attribute for storing in the column of the table when the new record is stored in the table, the method comprising the steps of:

searching for a target page in the series of table pages, the target page being selected to include a target record having a target attribute stored in the column of the table, the target attribute being selected to be equal to the new attribute if the column contains a record equal to the new record, otherwise the target attribute being selected to be one of a next higher attribute above the new attribute and stored in the column, and a next lower attribute below the new attribute and stored in the column;

searching the target page for sufficient free space to accommodate the new record;

if sufficient free space is found on the target page, then inserting the new record on the target page;

if sufficient free space is not found on the target page, then searching a target neighborhood of pages in the series of table pages, the target neighborhood of pages surrounding the target page;

if sufficient free space is found on a page in the target neighborhood of pages, then inserting the new record onto the page in the target neighborhood of pages;

if sufficient free space is not found in the target neighborhood of pages, then searching for sufficient free space to accommodate the new record in the series of table pages outside the target neighborhood of pages;

if sufficient free space is found outside the target neighborhood of pages, then inserting the new record on a non-neighboring page outside the target neighborhood of pages; and if sufficient free space is not found outside the target neighborhood of pages, then appending a new page having the new record to the end of the table.

2. The method as defined in claim 1 wherein if the column has no record attribute stored therein equal to the new record, then the target attribute is selected to the next higher attribute above the new attribute and contained in the column.

3. The method as defined in claim 1 wherein the availability of free space in the table pages is indicated by a free space map having a plurality of map pages, each map page including an associated set of free space indicators, each table page indexed in the space map page having an associated free space indicator in the associated set of free space indicators;

the step of searching the target neighborhood of pages comprises selecting a target map page, the target page being indexed on the target map page selecting the target neighborhood of pages to be all of the table pages indexed on the target map page;

searching the associated set of free space indicators on the target map page for sufficient free space in the target neighborhood of pages to accommodate the new record; and, if the associated set of free space indicators for the target map page indicate that a table page in the target neighborhood of pages includes sufficient free space to accommodate the new record, fixing the table page and then searching the table page for sufficient free space to accommodate the new record.

4. The method as defined in claim 1 wherein the target neighborhood of pages comprises a plurality of table pages, the plurality of table pages being searched in ascending order based on distance from the target page.

5. The method as defined in claim 3 wherein the target neighborhood of pages comprises a plurality of table pages, the plurality of table pages being searched in ascending order based on distance from the target page.

6. The method as defined in claim 5 wherein the associated set of indicators for the target map pages comprises:

a target space indicator, the target space indicator being an associated space indicator for the target page, a first subset of space indicators, the first subset of space indicators being all of the space indicators on one side of the target space indicator on the target map page, and a second subset of space indicators, the second subset of space indicators being all of the space indicators on an opposite side of the target space indicator on the target map page from the first subset of space indicators;

and wherein the step of searching the associated set of free space indicators on the target map page further comprises:

(i) checking each free space indicator in the first subset of free space indicators and each free space indicator in the second subset of free space indicators for sufficient free space to accommodate the new record, each free space indicator in the first subset of free space indicators and each free space indicator in the second subset of free space indicators being checked in ascending order based on distance from the target page, (ii) while both the first subset of free space indicators and the second subset of free space indicators have not yet been fully checked, alternately checking the first subset of free space indicators and the second subset of free space indicators; and (iii) after all free space indicators in one of the first subset of free space indicators and the second subset of free space indicators has been checked, checking each free space indicator remaining unchecked in the other of the first subset of free space indicators and the second subset of free space indicators.

7. The method as defined in claim 1 wherein the step of searching for sufficient free space to accommodate the new record in the series of table pages outside the target neighborhood of pages comprises:

if sufficient free space is found in the series of table pages outside the target neighborhood of pages, then if the series of table pages outside the target neighborhood of pages includes a single page having sufficient free space to accommodate the new record, then inserting the new record on the single page; and if the series of table pages outside the target neighborhood of pages includes at least two pages having sufficient free space to accommodate the new record, then inserting the new record on an emptiest page in the at least two pages, the emptiest page being selected to have the most free space.

8. A method for searching a table for free space for inserting a new record into the table in a database management system, wherein the table resides in a storage media and comprises a series of table pages capable of storing a plurality of records, and has a clustering index defined on a column of the table, the method comprising the steps of:

searching a set of table pages in the series of table pages;

if sufficient free space is found in the set of table pages, then if the set of table pages includes a single page having sufficient free space to accommodate the new record, inserting the new record on the single page, and if the set of table pages includes at least two pages having sufficient free space to accommodate the new record, then inserting the new record on an emptiest page in the at least two pages; and, if sufficient free space is not found in the set of table pages, then appending a new page having the new record to the end of the table.

9. A method for searching a table for free space for inserting a new record into the table in a database management system, wherein the table resides in a storage media and comprises a series of table pages capable of storing a plurality of records, and has a clustering index defined on a column of the table, the method comprising the steps of:

searching a set of table pages in the series of table pages;

if sufficient free space is found in the set of table pages, then if the set of table pages includes a single page having sufficient free space to accommodate the new record, inserting the new record on the single page, and if the set of table pages includes at least two pages having sufficient free space to accommodate the new record, then inserting the new record on an emptiest page in the at least two pages;

if sufficient free space is not found in the set of table pages, then appending a new page having the new record to the end of the table;

wherein the availability of free space in the table pages is indicated by a free space map having a plurality of map pages, each map page including an associated set of free space indicators, each table page indexed in the space map page having an associated free space indicator in the associated set of free space indicators; and wherein the step of searching the set of table pages comprises:

(i) selecting a set of map pages from the plurality of map pages, the set of table pages being indexed on the set of map pages;

(ii) for each map page in the set of map pages, searching the associated set of free space indicators for sufficient free space to accommodate the new record, and (iii) for each table page in the set of table pages, if sufficient free space on the table page is indicated by the associated free space indicator, then checking the table page for sufficient free space to accommodate the new record.

10. A method for searching a table for free space for inserting a new record into the table in a database management system, wherein the table resides in a storage media and comprises a series of table pages capable of storing a plurality of records, and has a clustering index defined on a column of the table, the method comprising the steps of:

searching a set of table pages in the series of table pages;

if sufficient free space is found in the set of table pages, then if the set of table pages includes a single page having sufficient free space to accommodate the new record, inserting the new record on the single page, and if the set of table pages includes at least two pages having sufficient free space to accommodate the new record, then inserting the new record on an emptiest page in the at least two pages;

if sufficient free space is not found in the set of table pages, then appending a new page having the new record to the end of the table; and wherein the availability of free space in the table pages is indicated by a free space map having a plurality of map pages, each map page including an associated set of free space indicators, each table page indexed in the space map page having an associated free space indicator in the associated set of free space indicators, and wherein the step of searching the set of table pages further comprises:

selecting a set of map pages from the plurality of map pages, the set of table pages being indexed on the set of map pages;

for each map page in the set of map pages, searching the associated set of free space indicators for sufficient free space to accommodate the new record, and, when sufficient free space is indicated by a free space indicator in the associated set of free space indicators, saving the free space indicator to an indicator array; and, for each table page in the set of table pages having an associated free space indicator saved in the indicator array, checking the table page for sufficient free space to accommodate the new record.

11. A method for searching a table for free space for inserting a new record into the table in a database management system, wherein the table resides in a storage media and comprises a series of table pages capable of storing a plurality of records, and has a clustering index defined on a column of the table, the method comprising the steps of:

searching a set of table pages in the series of table pages;

if sufficient free space is found in the set of table pages, then if the set of table pages includes a single page having sufficient free space to accommodate the new record, inserting the new record on the single page, and if the set of table pages includes at least two papers having sufficient free space to accommodate the new record, then inserting the new record on an emptiest page in the at least two pages;

if sufficient free space is not found in the set of table pages, then appending a new page having the new record to the end of the table; and wherein the availability of free space in the table pages is indicated by a free space map having a plurality of map pages, each map page including an associated set of free space indicators, each table page indexed in the space map page having an associated free space indicator in the associated set of free space indicators, and wherein the step of searching the set of table pages further comprises:

selecting a set of map pages from the plurality of map pages, the set of table pages being indexed on the set of map pages;

for each map page in the set of map pages, searching the associated set of free space indicators for sufficient free space to accommodate the new record, and, when sufficient free space is indicated by a free space indicator in the associated set of free space indicators, saving the free space indicator to an indicator array;

ordering the indicator array in descending order based on free space indicated by each free space indicator in the indicator array;

checking a subset of table pages in the set of table pages, each table page in the subset of table pages being selected to have an associated free space indicator in the indicator array, each table page in the subset of table pages being checked according to where the associated free space indicator for the table page is included in the array, and if sufficient free space is not found on each previously checked table page in the subset of table pages.

12. A computer program product for use on a computer system wherein transactions are executed for inserting data into a table in a database, the table residing in a storage media, comprising a series of table pages capable of storing a plurality of records, and having a clustering index defined on a column of the table, the new record having a new attribute for storing in the column of the table when the new record is stored in the table, the computer program product comprising a recording medium including means including code for instructing the computer system to perform:

searching for a target page in the series of table pages, the target page being selected to include a target record having a target attribute stored in the column of the table, the target attribute being selected to be equal to the new attribute if the column contains a record equal to the new record, otherwise the target attribute being selected to be one of a next higher attribute above the new attribute and stored in the column, and a next lower attribute below the new attribute and stored in the column;

searching the target page for sufficient free space to accommodate the new record;

if sufficient free space is found on the target page, then inserting the new record on the target page;

if sufficient free space is not found on the target page, then searching a target neighborhood of pages in the series of table pages, the target neighborhood of pages surrounding the target page;

if sufficient free space is found on a page in the target neighborhood of pages, then inserting the new record onto the page in the target neighborhood of pages;

if sufficient free space is not found in the target neighborhood of pages, then searching for sufficient free space to accommodate the new record in the series of table pages outside the target neighborhood of pages;

if sufficient free space is found outside the target neighborhood of pages, then inserting the new record on a non-neighboring page outside the target neighborhood of pages; and if sufficient free space is not found outside the target neighborhood of pages, then appending a new page having the new record to the end of the table.

13. The computer program product as defined in claim 12 wherein if the column has no record attribute stored therein equal to the new record, then the target attribute is selected to the next higher attribute above the new attribute and contained in the column.

14. The computer program product as defined in claim 12 wherein the availability of free space in the table pages is indicated by a free space map having a plurality of map pages, each map page including an associated set of free space indicators, each table page indexed in the space map page having an associated free space indicator in the associated set of free space indicators;

wherein searching the target neighborhood of pages further includes code for instructing the computer system to perform:

selecting a target map page, the target page being indexed on the target map page selecting the target neighborhood of pages to be all of the table pages indexed on the target map page;

searching the associated set of free space indicators on the target map page for sufficient free space in the target neighborhood of pages to accommodate the new record; and, if the associated set of free space indicators for the target map page indicate that a table page in the target neighborhood of pages includes sufficient free space to accommodate the new record, fixing the table page and then searching the table page for sufficient free space to accommodate the new record.

15. The computer program product as defined in claim 12 wherein the target neighborhood of pages comprises a plurality of table pages, the plurality of table pages being searched in ascending order based on distance from the target page.

16. The computer program product as defined in claim 15 wherein the target neighborhood of pages comprises a plurality of table pages, the plurality of table pages being searched in ascending order based on distance from the target page.

17. The computer program product as defined in claim 16 wherein the associated set of indicators for the target map pages comprises:
   a target space indicator, the target space indicator being an associated space indicator for the target page,
   a first subset of space indicators, the first subset of space indicators being all of the space indicators on one side of the target space indicator on the target map page, and
   a second subset of space indicators, the second subset of space indicators being all of the space indicators on an opposite side of the target space indicator on the target map page from the first subset of space indicators; and
   wherein searching the associated set of free space indicators on the target map page further includes code for instructing the computer system to perform:
      (i) checking each free space indicator in the first subset of free space indicators and each free space indicator in the second subset of free space indicators for sufficient free space to accommodate the new record, each free space indicator in the first subset of free space indicators and each free space indicator in the second subset of free space indicators being checked in ascending order based on distance from the target page;
      (ii) while both the first subset of free space indicators and the second subset of free space indicators have not yet been fully checked, alternately checking the first subset of free space indicators and the second subset of free space indicators; and
      (iii) after all free space indicators in one of the first subset of free space indicators and the second subset of free space indicators has been checked, checking each free space indicator remaining unchecked in the other of the first subset of free space indicators and the second subset of free space indicators.

18. The computer program product as defined in claim 12 wherein searching for sufficient free space to accommodate the new record in the series of table pages outside the target neighborhood of pages further includes code for instructing the computer system to perform:
   if sufficient free space is found in the series of table pages outside the target neighborhood of pages, then
      if the series of table pages outside the target neighborhood of pages includes a single page having sufficient free space to accommodate the new record, then inserting the new record on the single page; and
      if the series of table pages outside the target neighborhood of pages includes at least two pages having sufficient free space to accommodate the new record, then inserting the new record on an emptiest page in the at least two pages, the emptiest page being selected to have the most free space.

19. A computer program product for use on a computer system wherein transactions are executed for inserting data into a table in a database, the table residing in a storage media, comprising a series of table pages capable of storing a plurality of records, and having a clustering index defined on a column of the table, the computer program product comprising a recording medium including code for instructing the computer system to perform:
   searching a set of table pages in the series of table pages;
   if sufficient free space is found in the set of table pages, then
      if the set of table pages includes a single page having sufficient free space to accommodate the new record, inserting the new record on the single page, and
      if the set of table pages includes at least two pages having sufficient free space to accommodate the new record, then inserting the new record on an emptiest page in the at least two pages; and,
   if sufficient free space is not found in the set of table pages, then appending a new page having the new record to the end of the table.

20. A data processing system for searching a table for free space for inserting a new record into the table in a database management system, wherein the table resides in a storage media, comprises a series of table pages capable of storing a plurality of records, and has a clustering index defined on a column of the table, wherein the new record has a new attribute for storing in the column of the table when the new record is stored in the table, and wherein the data processing system is capable of performing:
   searching for a target page in the series of table pages, the target page being selected to include a target record having a target attribute stored in the column of the table, the target attribute being selected to be equal to the new attribute if the column contains a record equal to the new record, otherwise the target attribute being selected to be one of a next higher attribute above the new attribute and stored in the column, and a next lower attribute below the new attribute and stored in the column;
   searching the target page for sufficient free space to accommodate the new record;
   if sufficient free space is found on the target page, then inserting the new record on the target page;
   if sufficient free space is not found on the target page, then searching a target neighborhood of pages in the series of table pages, the target neighborhood of pages surrounding the target page;
   if sufficient free space is found on a page in the target neighborhood of pages, then inserting the new record onto the page in the target neighborhood of pages;
   if sufficient free space is not found in the target neighborhood of pages, then searching for sufficient free space to accommodate the new record in the series of table pages outside the target neighborhood of pages;
   if sufficient free space is found outside the target neighborhood of pages, then inserting the new record on a non-neighboring page outside the target neighborhood of pages; and
   if sufficient free space is not found outside the target neighborhood of pages, then appending a new page having the new record to the end of the table.

21. A data processing system for searching a table for free space for inserting a new record into the table in a database management system, wherein the table resides in a storage media, comprises a series of table pages capable of storing a plurality of records, and has a clustering index defined on a column of the table, and wherein the data processing system is capable of performing:
   searching a set of table pages in the series of table pages;
   if sufficient free space is found in the set of table pages, then if the set of table pages includes a single page having sufficient free space to accommodate the new record, inserting the new record on the single page, and if the set of table pages includes at least two pages having sufficient free space to accommodate the new record, then inserting the new record on an emptiest page in the at least two pages; and, if sufficient free space is not found in the set of table pages, then appending a new page having the new record to the end of the table.

22. A method for determining a location in a database to insert a new record in a database table, wherein the new record includes a key value, comprising:

determining a target page having a record in the table that includes a key value that equals the key value of the new record, wherein the pages in storage are capable of storing records from the table;

storing the new record in the target page if the target page has sufficient free space to store the new record;

determining a page closest to the target page that has sufficient free space to store the new record if the target page does not have sufficient space using a space map; and storing the new record in the determined closest page if the target page does not have sufficient free space.

23. The method of claim 22, wherein the table comprises an index implemented as a tree having nodes, wherein each node is capable of including one or more records, and wherein determining a target page further comprises:

selecting a leaf node in the index tree;

determining whether a record in the selected leaf node includes a key value matching the new record key value;

determining a storage page including the record including the key value matching the new record key value; and selecting the determined storage page as the target page.

24. The method of claim 23, further comprising:

determining whether there is a record including a key value following the new record key value on the selected leaf node if the selected leaf node does not include a record having a key value equal to the new record key value; and determining a storage page including the record including the key value following the new record key value, wherein the determined storage page is selected as the target storage page.

25. The method of claim 24, further comprising:

determining a next leaf node if the selected leaf node does not include a record having a key value following the new record key value;

determining a storage page including a record in the next leaf node having a key value equal to the key value of the new record key value; and determining a storage page including a record in the next leaf node having a key value following the new record key value if the next leaf node does not include a record having the key value.

26. A method for determining a location in a database to insert a new record in a database table, wherein the new record includes a key value, comprising:

determining a target page having a record in the table that includes a key value that equals the key value of the new record, wherein the pages in storage are capable of storing records from the table;

storing the new record in the target page if the target page has sufficient free space to store the new record, wherein determining whether the target page has sufficient free space further comprises accessing a space map indicating available free space in each page to determine whether the free space indicated for the target page is sufficient to store the new record;

determining a page closest to the target page that has sufficient free space to store the new record if the target page does not have sufficient space, wherein determining the page closest to the target page that has sufficient free space further comprises accessing the space map indicating free space available in other pages and a relative distance of pages with respect to each other; and storing the new record in the determined closest page if the target page does not have sufficient free space.

27. The method of claim 26, wherein the space map provides a page offset and free space for each storage page, wherein pages having offset values whose relative difference is less are located closer in the storage than pages having offset values whose relative difference is greater, and wherein determining a page closest to the target page that has sufficient free space comprises determining a page that has an offset to the target page offset and sufficient free space to store the new record.

28. The method of claim 27, wherein a function is applied to the page offset of the target page to select a next page offset and corresponding page to consider as the closest offset to the target page, wherein the function selects page offsets before and after the page offset being considered as the closest offset to the target page.

29. The method of claim 27, further comprising:

maintaining a variable indicating a maximum number of times to search through all the pages having offsets in the space map to locate free space for the new record; and searching a subsequent time all the pages in the free space for the page offset closest to the target offset that has sufficient free space to store the new record if the entire space map has been searched fewer than the maximum number of times indicated in the variable.

30. The method of claim 29, wherein after the space map has been searched the maximum number of times, performing:

providing a new storage page to store records in the table after the space map has been searched the maximum variable number of times; and storing the new record in the new storage page when a new page is provided.

31. The method of claim 30, further comprising:

setting a variable to indicate that the pages in the space map can be searched again to locate free space for subsequent new records if a number of pages appended to the space map exceeds a threshold after the space map has been searched the maximum number of times.

32. The method of claim 30, further comprising:

determining whether the storage includes sufficient unused space to provide a new page, wherein a new storage page is not provided if the storage does not include sufficient unused space; and continuing to search the space map for free space if the storage does not include sufficient unused space.

33. The method of claim 32, further comprising:

setting a full flag if the space map has been searched a threshold number of times without locating sufficient free space to store the new record and there is not sufficient unused space in the storage to add a new storage page, wherein the space map is not searched for free space while the full flag is set;

upon a modification to records in the table, adding an amount of space freed as a result of the modification to a space freed variable; and resetting the full flag if the space freed variable exceeds a threshold to cause the space map to be searched for free space for the new record.

34. The method of claim 27, further comprising:

maintaining a variable indicating a maximum number of pages to search having offsets in the space map to locate free space for the new record; and searching a next page in the space map for the page offset closest to the target offset that has sufficient free space to store the new record if the maximum number of pages have not been searched.

35. A system for determining a location in a database to insert a new record in a database table, wherein the new record includes a key value, comprising:

a storage including pages capable of storing records in the database table;

a processor capable of accessing the storage including code capable of causing the processor to perform:
  (i) determining a target page having a record in the table that includes a key value that equals the key value of the new record, wherein the pages in storage are capable of storing records from the table;
  (ii) storing the new record in the target page if the target page has sufficient free space to store the new record;
  (iii) determining a page closest to the target page that has sufficient free space to store the new record if the target page does not have sufficient space using a space map; and
  (iv) storing the new record in the determined closest page if the target page does not have sufficient free space.

36. The system of claim 35, wherein the table comprises an index implemented as a tree having nodes, wherein each node is capable of including one or more records, and wherein the code for determining a target page is further capable of causing the processor to perform:

selecting a leaf node in the index tree;

determining whether a record in the selected leaf node includes a key value matching the new record key value;

determining a storage page including the record including the key value matching the new record key value; and selecting the determined storage page as the target page.

37. The system of claim 36, wherein the code is further capable of causing the processor to perform:

determining whether there is a record including a key value following the new record key value on the selected leaf node if the selected leaf node does not include a record having a key value equal to the new record key value; and determining a storage page including the record including the key value following the new record key value, wherein the determined storage page is selected as the target storage page.

38. The system of claim 37, wherein the code is further capable of causing the processor to perform:

determining a next leaf node if the selected leaf node does not include a record having a key value following the new record key value;

determining a storage page including a record in the next leaf node having a key value equal to the key value of the new record key value; and determining a storage page including a record in the next leaf node having a key value following the new record key value if the next leaf node does not include a record having the key value.

39. A system for determining a location in a database to insert a new record in a database table. wherein the new record includes a key value, comprising:

a storage including pages capable of storing records in the database table;

a processor capable of accessing the storage including code capable of causing the processor to perform:
  (i) determining a target page having a record in the table that includes a key value that equals the key value of the new record, wherein the pages in storage are capable of storing records from the table;
  (ii) storing the new record in the target pare if the target page has sufficient free space to store the new record, wherein determining whether the target page has sufficient free space further comprises accessing a space map indicating available free space in each page to determine whether the free space indicated for the target page is sufficient to store the new record;
  (iii) determining a page closest to the target page that has sufficient free space to store the new record if the target page does not have sufficient space, wherein determining the page closest to the target page that has sufficient free space further comprises accessing the space map indicating free space available in other pages and a relative distance of pages with respect to each other; and
  (iv) storing the new record in the determined closest page if the target page does not have sufficient free space.

40. The system of claim 39, wherein the space map provides a page offset and free space for each storage page, wherein pages having offset values whose relative difference is less are located closer in the storage than pages having offset values whose relative difference is greater, and wherein determining a page closest to the target page that has sufficient free space comprises determining a page that has an offset to the target page offset and sufficient free space to store the new record.

41. The system of claim 40, wherein a function is applied to the page offset of the target page to select a next page offset and corresponding page to consider as the closest offset to the target page, wherein the function selects page offsets before and after the page offset being considered as the closest offset to the target page.

42. The system of claim 40, wherein the code is further capable of causing the processor to perform:

maintaining a variable indicating a maximum number of times to search through all the pages having offsets in the space map to locate free space for the new record; and searching a subsequent time all the pages in the free space for the page offset closest to the target offset that has sufficient free space to store the new record if the entire space map has been searched fewer than the maximum number of times indicated in the variable.

43. The system of claim 42, wherein after the space map has been searched the maximum number of times, the code further causes the processor to perform:

providing a new storage page to store records in the table after the space map has been searched the maximum variable number of times; and storing the new record in the new storage page when a new page is provided.

44. The system of claim 43, wherein the code is further capable of causing the processor to perform:

setting a variable to indicate that the pages in the space map can be searched again to locate free space for subsequent new records if a number of pages appended to the space map exceeds a threshold after the space map has been searched the maximum number of times.

45. The system of claim 43, wherein the code is further capable of causing the processor to perform:

determining whether the storage includes sufficient unused space to provide a new page, wherein a new storage page is not provided if the storage does not include sufficient unused space; and continuing to search the space map for free space if the storage does not include sufficient unused space.

46. The system of claim 45, wherein the code is further capable of causing the processor to perform:

setting a full flag if the space map has been searched a threshold number of times without locating sufficient free space to store the new record and there is not sufficient unused space in the storage to add a new storage page, wherein the space map is not searched for free space while the full flag is set;

upon a modification to records in the table, adding an amount of space freed as a result of the modification to a space freed variable; and resetting the full flag if the space freed variable exceeds a threshold to cause the space map to be searched for free space for the new record.

47. The system of claim 40, wherein the code is further capable of causing the processor to perform:

maintaining a variable indicating a maximum number of pages to search having offsets in the space map to locate free space for the new record; and searching a next page in the space map for the page offset closest to the target offset that has sufficient free space to store the new record if the maximum number of pages have not been searched.

48. A program for determining a location in a database to insert a new record in a database table, wherein the new record includes a key value, wherein storage includes pages capable of storing records in the database table, and wherein the program includes code embedded in a computer readable medium that is capable of causing a processor to perform:

determining a target page having a record in the table that includes a key value that equals the key value of the new record, wherein the pages in storage are capable of storing records from the table;

storing the new record in the target page if the target page has sufficient free space to store the new record;

determining a page closest to the target page that has sufficient free space to store the new record if the target page does not have sufficient space using a space map; and storing the new record in the determined closest page if the target page does not have sufficient free space.

49. The program of claim 48, wherein the table comprises an index implemented as a tree having nodes, wherein each node is capable of including one or more records, and wherein the code for determining a target page is further capable of causing the processor to perform:

selecting a leaf node in the index tree;

determining whether a record in the selected leaf node includes a key value matching the new record key value;

determining a storage page including the record including the key value matching the new record key value; and selecting the determined storage page as the target page.

50. The program of claim 49, wherein the program code is further capable of causing the processor to perform:

determining whether there is a record including a key value following the new record key value on the selected leaf node if the selected leaf node does not include a record having a key value equal to the new record key value; and determining a storage page including the record including the key value following the new record key value, wherein the determined storage page is selected as the target storage page.

51. The program of claim 50, wherein the program code is further capable of causing the processor to perform:

determining a next leaf node if the selected leaf node does not include a record having a key value following the new record key value;

determining a storage page including a record in the next leaf node having a key value equal to the key value of the new record key value; and determining a storage page including a record in the next leaf node having a key value following the new record key value if the next leaf node does not include a record having the key value.

52. A program for determining a location in a database to insert a new record in a database table, wherein the new record includes a key value, wherein storage includes pages capable of storing records in the database table, and wherein the program includes code embedded in a computer readable medium that is capable of causing a processor to perform:

determining a target page having a record in the table that includes a key value that equals the key value of the new record, wherein the pages in storage are capable of storing records from the table;

storing the new record in the target page if the target page has sufficient free space to store the new record, wherein determining whether the target page has sufficient free space further comprises accessing a space map indicating available free space in each page to determine whether the free space indicated for the target age is sufficient to store the new record;

determining a page closest to the target page that has sufficient free space to store the new record if the target page does not have sufficient space, wherein determining the page closest to the target page that has sufficient free space further comprises accessing the space map indicating free space available in other pages and a relative distance of pages with respect to each other; and storing the new record in the determined closest page if the target page does not have sufficient free space.

53. The program of claim 52, wherein the space map provides a page offset and free space for each storage page, wherein pages having offset values whose relative difference is less are located closer in the storage than pages having offset values whose relative difference is greater, and wherein determining a page closest to the target page that has sufficient free space comprises determining a page that has an offset to the target page offset and sufficient free space to store the new record.

54. The program of claim 53, wherein a function is applied to the page offset of the target page to select a next page offset and corresponding page to consider as the closest offset to the target page, wherein the function selects page offsets before and after the page offset being considered as the closest offset to the target page.

55. The program of claim 53, wherein the program code is further capable of causing the processor to perform:
  maintaining a variable indicating a maximum number of times to search through all the pages having offsets in the space map to locate free space for the new record; and
  searching a subsequent time all the pages in the free space for the page offset closest to the target offset that has sufficient free space to store the new record if the entire space map has been searched fewer than the maximum number of times indicated in the variable.

56. The program of claim 55, wherein after the space map has been searched the maximum number of times, the program code further causes the processor to perform:
  providing a new storage page to store records in the table after the space map has been searched the maximum variable number of times; and
  storing the new record in the new storage page when a new page is provided.

57. The program of claim 56, wherein the program code is further capable of causing the processor to perform:
  setting a variable to indicate that the pages in the space map can be searched again to locate free space for subsequent new records if a number of pages appended to the space map exceeds a threshold after the space map has been searched the maximum number of times.

58. The program of claim 56, wherein the program code is further capable of causing the processor to perform:
  determining whether the storage includes sufficient unused space to provide a new page, wherein a new storage page is not provided if the storage does not include sufficient unused space; and
  continuing to search the space map for free space if the storage does not include sufficient unused space.

59. The program of claim 58, wherein the program code is further capable of causing the processor to perform:
  setting a full flag if the space map has been searched a threshold number of times without locating sufficient free space to store the new record and there is not sufficient unused space in the storage to add a new storage page, wherein the space map is not searched for free space while the full flag is set;
  upon a modification to records in the table, adding an amount of space freed as a result of the modification to a space freed variable; and
  resetting the full flag if the space freed variable exceeds a threshold to cause the space map to be searched for free space for the new record.

60. The program of claim 53, wherein the program code is further capable of causing the processor to perform:
  maintaining a variable indicating a maximum number of pages to search having offsets in the space map to locate free space for the new record; and
  searching a next page in the space map for the page offset closest to the target offset that has sufficient free space to store the new record if the maximum number of pages have not been searched.

61. A computer program product for use on a computer system wherein transactions are executed for inserting data into a table in a database, the table residing in a storage media, comprising a series of table pages capable of storing a plurality of records, and having a clustering index defined on a column of the table, the computer program product comprising a recording medium including code for instructing the computer system to perform:
  searching a set of table pages in the series of table pages;
  if sufficient free space is found in the set of table pages, then
    if the set of table pages includes a single page having sufficient free space to accommodate the new record, inserting the new record on the single page, and
    if the set of table pages includes at least two pages having sufficient free space to accommodate the new record, then inserting the new record on an emptiest page in the at least two pages;
  if sufficient free space is not found in the set of table pages, then appending a new page having the new record to the end of the table;
  wherein the availability of free space in the table pages is indicated by a free space map having a plurality of map pages, each map page including an associated set of free space indicators, each table page indexed in the space map page having an associated free space indicator in the associated set of free space indicators; and
  wherein the step of searching the set of table pages comprises:
    (i) selecting a set of map pages from the plurality of map pages, the set of table pages being indexed on the set of map pages;
    (ii) for each map page in the set of map pages, searching the associated set of free space indicators for sufficient free space to accommodate the new record, and
    (iii) for each table page in the set of table pages, if sufficient free space on the table page is indicated by the associated free space indicator, then checking the table page for sufficient free space to accommodate the new record.

62. A computer program product for use on a computer system wherein transactions are executed for inserting data into a table in a database, the table residing in a storage media, comprising a series of table pages capable of storing a plurality of records, and having a clustering index defined on a column of the table, the computer program product comprising a recording medium including code for instructing the computer system to perform:
  searching a set of table pages in the series of table pages;
  if sufficient free space is found in the set of table pages, then
    if the set of table pages includes a single page having sufficient free space to accommodate the new record, inserting the new record on the single page, and
    if the set of table pages includes at least two pages having sufficient free space to accommodate the new record, then inserting the new record on an emptiest page in the at least two pages;
  if sufficient free space is not found in the set of table pages, then appending a new page having the new record to the end of the table; and
  wherein the availability of free space in the table pages is indicated by a free space map having a plurality of map pages, each map page including an associated set of free space indicators, each table page indexed in the space map page having an associated free space indicator in the associated set of free space indicators, and wherein the step of searching the set of table pages further comprises:

selecting a set of map pages from the plurality of map pages, the set of table pages being indexed on the set of map pages;

for each map page in the set of map pages, searching the associated set of free space indicators for sufficient free space to accommodate the new record, and, when sufficient free space is indicated by a free space indicator in the associated set of free space indicators, saving the free space indicator to an indicator array; and, for each table page in the set of table pages having an associated free space indicator saved in the indicator array, checking the table page for sufficient free space to accommodate the new record.

63. A computer program product for use on a computer system wherein transactions are executed for inserting data into a table in a database, the table residing in a storage media, comprising a series of table pages capable of storing a plurality of records, and having a clustering index defined on a column of the table, the computer program product comprising a recording medium including code for instructing the computer system to perform:

searching a set of table pages in the series of table pages;

if sufficient free space is found in the set of table pages, then if the set of table pages includes a single page having sufficient free space to accommodate the new record, inserting the new record on the single page, and if the set of table pages includes at least two pages having sufficient free space to accommodate the new record, then inserting the new record on an emptiest page in the at least two pages;

if sufficient free space is not found in the set of table pages, then appending a new page having the new record to the end of the table; and wherein the availability of free space in the table pages is indicated by a free space map having a plurality of map pages, each map page including an associated set of free space indicators, each table page indexed in the space map page having an associated free space indicator in the associated set of free space indicators, and wherein the step of searching the set of table pages further comprises:

selecting a set of map pages from the plurality of map pages, the set of table pages being indexed on the set of map pages;

for each map page in the set of map pages, searching the associated set of free space indicators for sufficient free space to accommodate the new record, and, when sufficient free space is indicated by a free space indicator in the associated set of free space indicators, saving the free space indicator to an indicator array;

ordering the indicator array in descending order based on free space indicated by each free space indicator in the indicator array;

checking a subset of table pages in the set of table pages, each table page in the subset of table pages being selected to have an associated free space indicator in the indicator array, each table page in the subset of table pages being checked according to where the associated free space indicator for the table page is included in the array, and if sufficient free space is not found on each previously checked table page in the subset of table pages.

* * * * *

UNITED STATES PATENT AND TRADEMARK OFFICE
CERTIFICATE OF CORRECTION

PATENT NO. : 6,668,263 B1
DATED : December 23, 2003
INVENTOR(S) : Leslie A. Cranston et al.

It is certified that error appears in the above-identified patent and that said Letters Patent is hereby corrected as shown below:

<u>Column 25,</u>
Line 24, delete the second "papers" and insert -- pages --.

<u>Column 28,</u>
Line 12, delete "and," and insert -- and --.

<u>Column 32,</u>
Line 9, delete "table." and insert -- table, --.

<u>Column 34,</u>
Line 48, delete "age" and insert -- page --.

Signed and Sealed this

Thirteenth Day of June, 2006

JON W. DUDAS
*Director of the United States Patent and Trademark Office*